United States Patent
Yang et al.

(10) Patent No.: US 12,205,043 B2
(45) Date of Patent: Jan. 21, 2025

(54) METHOD AND APPARATUS FOR GENERATING KNOWLEDGE GRAPH, METHOD FOR RELATION MINING

(71) Applicant: BEIJING BAIDU NETCOM SCIENCE AND TECHNOLOGY CO., LTD., Beijing (CN)

(72) Inventors: Shuangquan Yang, Beijing (CN); Yang Zhang, Beijing (CN); Chang Liu, Beijing (CN); Yi Xie, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 976 days.

(21) Appl. No.: 17/208,921

(22) Filed: Mar. 22, 2021

(65) Prior Publication Data

US 2021/0319329 A1  Oct. 14, 2021

(30) Foreign Application Priority Data

Mar. 30, 2020 (CN) .......................... 202010238498.0

(51) Int. Cl.
  *G06F 16/901* (2019.01)
  *G06F 16/906* (2019.01)
  *G06N 5/022* (2023.01)

(52) U.S. Cl.
  CPC .......... *G06N 5/022* (2013.01); *G06F 16/906* (2019.01)

(58) Field of Classification Search
  CPC ... G06F 16/9024; G06F 16/288; G06F 16/906
  See application file for complete search history.

(56) References Cited

U.S. PATENT DOCUMENTS

| 2015/0370787 A1 | 12/2015 | Akbacak et al. |
| 2018/0048662 A1* | 2/2018 | Jang .................... H04L 63/1425 |
| 2018/0189634 A1 | 7/2018 | Abdelaziz et al. |

FOREIGN PATENT DOCUMENTS

| CN | 109710776 A | 5/2019 |
| CN | 110457403 A | * 11/2019 .......... G06F 16/288 |
| CN | 110472068 A | 11/2019 |
| CN | 110727804 A | 1/2020 |
| CN | 110866190 A | 3/2020 |
| CN | 110929047 A | 3/2020 |

(Continued)

OTHER PUBLICATIONS

English translation of CN-110457403-A.*

(Continued)

*Primary Examiner* — Samantha (Yuehan) Wang
(74) *Attorney, Agent, or Firm* — Lippes Mathias LLP

(57) ABSTRACT

The present disclosure provides a method for generating a knowledge graph, a method for mining relation and an apparatus for generating a knowledge graph. The method for generating a knowledge graph includes: obtaining an initial knowledge graph, wherein the initial knowledge graph comprises a plurality of nodes having connection relationships; determining a plurality of target map elements meeting preset property information requirements from the initial knowledge graph, in which the target map elements comprise target nodes, or target edges; and merging the plurality of the target map elements to generate a knowledge graph.

17 Claims, 18 Drawing Sheets

(56) References Cited

FOREIGN PATENT DOCUMENTS

| JP | H08249338 A | 9/1996 |
|---|---|---|
| JP | 2003162533 A | 6/2003 |
| JP | 2008203964 A | 9/2008 |
| WO | 2020039871 A1 | 2/2020 |
| WO | 2020051249 A1 | 3/2020 |

OTHER PUBLICATIONS

English Translation of CN-110457403-A (Year: 2019).*
Office Action for Chinese Application No. 202010238498.0, dated Feb. 24. 2023, 17 pages.
Extended European Search Report for Application No. 21164298.8, dated Aug. 12, 2021, 6 pages.
Office Action for Korean Patent Application No. 10-2021-0037307, dated Oct. 27, 2023, 62 pages.
Liu, Yike et al., "Graph Summarization Methods and Applications: A Survey"; ACM Comput. Surv. 51, 3, Article 62; Jun. 2018; 34 pages.
Office Action for Japanese Application No. 2021-049223, dated Mar. 8, 2022, 6 pages.
Notice of Allowance for Chinese Application No. 202010238498.0, dated Jul. 25, 2023, 13 pages.
Yuanchun, Zhou et al.; "SKS: a Platform for Big Data Based Scientific Knowledge Graph"; Frontiers of Data & Computing, vol. 1, Issue 1; Oct. 11, 2019, 12 pages, English Abstract.
Jayaram, Nandish et al.; "Querying Knowledge Graphs by Example Entity Tuples"; IEEE Xplore; May 19, 2014; 16 pages.

\* cited by examiner

METHOD AND APPARATUS FOR GENERATING KNOWLEDGE GRAPH, METHOD FOR RELATION MINING

CROSS REFERENCE TO RELATED APPLICATION

This application is based on and claims priority to Chinese patent application No. 202010238498.0, filed on Mar. 30, 2020, the entire content of which is hereby introduced into this application as a reference.

TECHNICAL FIELD

The present disclosure relates to a field of computer technologies, and more particularly, to a field of knowledge graph technologies.

BACKGROUND

Knowledge graph is called knowledge domain visualization or knowledge domain mapping map in a library and information industry, which is a series of various graphs showing knowledge development process and structural relation, describes knowledge resources and carriers through visualization technologies, and mines, analyzes, constructs, draws and indicates knowledge and their interrelationships.

For example, in a social relation knowledge graph, nodes in the graph represent persons, and edges connecting the nodes represent relations between people. For example, in a financial knowledge graph, nodes in the graph represent accounts, and edges connecting the nodes represent a relation for transferring money between the accounts.

SUMMARY

The present disclosure provides a method for generating a knowledge graph, a method for relation mining and an apparatus for generating a knowledge graph.

Embodiments of a first aspect of the present disclosure provide a method for generating a knowledge graph. The method includes: obtaining an initial knowledge graph, wherein the initial knowledge graph includes a plurality of nodes having connection relationships; determining a plurality of target map elements meeting preset property information requirements from the initial knowledge graph, in which the target map elements include target nodes, or target edges; and merging the plurality of target map elements to generate a knowledge graph.

Embodiments of a second aspect of the present disclosure provide a method for relation mining based on a knowledge graph, the knowledge graph is generated according to the method for generating a knowledge graph. The method includes: obtaining the knowledge graph and a dynamic relation to be mined; determining information to be mined based on the dynamic relation, in which the information to be mined includes nodes to be mined and property information to be mined; determining a starting node in the knowledge graph and a screening condition based on the information to be mined; and traversing the knowledge graph from the starting node, and screening traversed nodes based on the screening condition to obtain nodes in the dynamic relation.

Embodiments of a third aspect of the present disclosure provide an apparatus for generating a knowledge graph. The apparatus includes: an obtaining module, a determining module and a generating module. The obtaining module is configured to obtain an initial knowledge graph, in which the initial knowledge graph includes a plurality of nodes having connection relationships. The determining module is configured to determine a plurality of target map elements meeting preset property information requirements from the initial knowledge graph, in which the target map elements include target nodes, or target edges. The generating module is configured to merge the plurality of the target map elements to generate a knowledge graph.

It should be understood that the content described in this section is not intended to identify key or important features of the embodiments of the present disclosure, nor is it intended to limit the scope of the present disclosure. Additional features of the present disclosure will be easily understood based on the following description.

BRIEF DESCRIPTION OF THE DRAWINGS

The drawings are used to better understand the solution and do not constitute a limitation to the disclosure, in which.

DETAILED DESCRIPTION

The following describes the exemplary embodiments of the present disclosure with reference to the accompanying drawings, which includes various details of the embodiments of the present disclosure to facilitate understanding, which shall be considered merely exemplary. Therefore, those of ordinary skill in the art should recognize that various changes and modifications can be made to the embodiments described herein without departing from the scope and spirit of the present disclosure. For clarity and conciseness, descriptions of well-known functions and structures are omitted in the following description.

Figure 1:
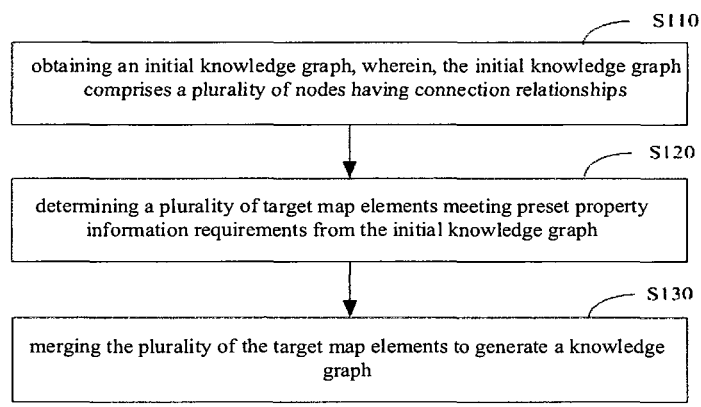
FIG. 1 is a flowchart of a method for generating a knowledge graph according to a first embodiment of the present disclosure.

In an embodiment, FIG. 1 is a flowchart of a method for generating a knowledge graph according to a first embodiment of the present disclosure. This embodiment is applicable for a case of reprocessing an initial knowledge graph. The method is executed by an apparatus for generating a knowledge graph, which is implemented in software and/or hardware, and is integrated in an electronic device. For example, the electronic device may be a terminal or a server. As illustrated in FIG. 1, the method for generating a knowledge graph according to this embodiment may include the followings.

At block S110, an initial knowledge graph is obtained, the initial knowledge graph includes a plurality of nodes (or points) having connection relationships.

The initial knowledge graph may be any knowledge graph in the related art, or a knowledge graph constructed using data sources. The initial knowledge graph includes the plurality of nodes having the connection relationships, the nodes represent entities, edges between nodes represent relations, and the entities and relations have property (or attribute) information.

For example, each node has a direct or indirect connection relationship with another node in the initial knowledge graph. There is no isolated subgraph in the initial knowledge graph, that is, the initial knowledge graph is a connected graph, thereby avoiding information missing due to unconnected graphs in subsequent progresses of applying the knowledge graph.

At block S120, a plurality of target map elements meeting preset property information requirements are determined from the initial knowledge graph.

In detail, the property information includes a value of the property information and a type of the property information, and the preset property information requirements include requirements on at least one of the value of the property information and the type of the property information. The target map elements include target nodes, or target edges. In detail, each node and each edge of the initial knowledge graph are traversed, and nodes or edges or nodes and edges meeting the preset property information requirements, such as nodes having time properties and spatial properties (hereinafter referred to as space-time properties), are searched. In order to facilitate descriptions and distinctions, the nodes and edges meeting the preset property information requirements are respectively called target nodes and target edges.

At block S130, the plurality of the target map elements are merged to generate a knowledge graph.

In an implementation, the plurality of target nodes are merged into a same node, and the merged node still has the property information of the plurality of the target nodes. At the same time, the edges connected to the plurality of the target nodes are connected to the merged node.

In another implementation, the plurality of target edges are merged into one edge, and the merged edge still has the property information of the plurality of the edges. For example, when the nodes connected to different target edges are different, the different nodes are merged, and the merged node still has the property information of the different nodes.

In still another implementation, the plurality of target nodes are merged into one node. At the same time, the plurality of target edges are merged into one edge. Details refer to the above descriptions, which are not repeated here.

In an embodiment, with merging the plurality of target nodes and/or the plurality of target edges meeting the preset property information requirements in the initial knowledge graph, the nodes and edges are capable of expressing more property information and expressive capability of the knowledge graph is improved. Moreover, a structure of the graph may be reduced. When the knowledge graph is applied to business scenarios such as dynamic relation mining, an analysis process may be simplified, the amount of calculation may be reduced, and efficiency of the calculation may be improved.

Figure 2A:
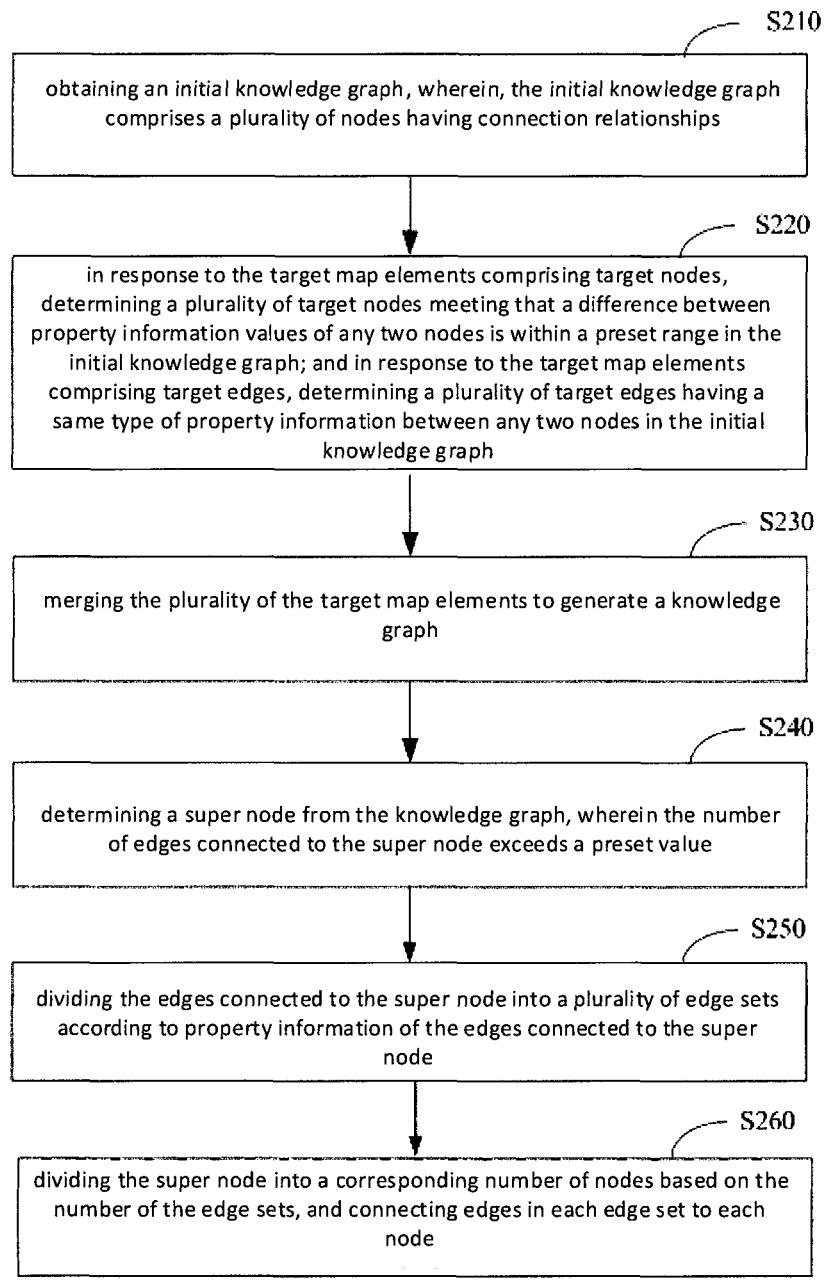
FIG. 2a is a flowchart of a method for generating a knowledge graph according to a second embodiment of the present disclosure.

In an embodiment of the present disclosure, FIG. 2a is a flowchart of a method for generating a knowledge graph according to a second embodiment of the present disclosure. This embodiment is further implemented based on the above embodiment.

For example, "determining the plurality of the target map elements meeting the preset property information requirements from the initial knowledge graph" includes "in response to the target map elements including target nodes, determining a plurality of target nodes meeting that a difference between property information values of any two nodes is within a preset range in the initial knowledge graph; and in response to the target map elements including target edges, determining a plurality of target edges having a same type of property information between any two nodes in the initial knowledge graph", which defines the preset property information requirements.

Moreover, after "merging the plurality of the target map elements to generate the knowledge graph", "determining a super node from the knowledge graph, wherein a number of edges connected to the super node exceeds a preset value; dividing the edges connected to the super node into a plurality of edge sets according to property information of the edges connected to the super node; and dividing the super node into a corresponding number of nodes based on the number of the edge sets, and connecting edges in each edge set to each node" is added, so as to avoid occurrence of super nodes.

The method for generating a knowledge graph provided in FIG. 2a includes the followings.

At block S210, an initial knowledge graph is obtained, the initial knowledge graph includes a plurality of nodes having connection relationships.

Figure 2B:
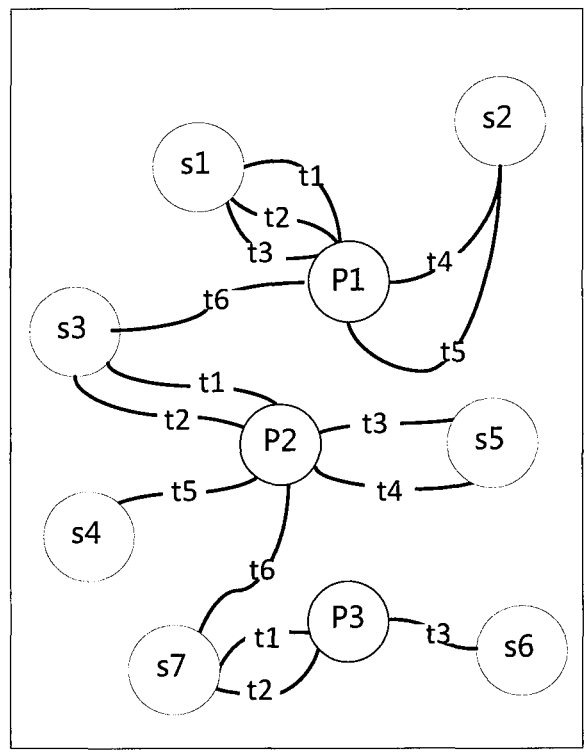
FIG. 2b is a schematic diagram of an initial knowledge graph according to an embodiment of the present disclosure.

FIG. 2b is a schematic diagram of an initial knowledge graph according to an embodiment of the present disclosure. FIG. 2b includes two types of nodes, which are started with P and s for distinguishing, and the same type of nodes are distinguished by a number after P or s. The connection lines between the nodes represent the relations between the nodes. T1~t6 on the connection lines represent different values of time properties, which generally represent different times.

At block S220, in response to the target map elements including target nodes, a plurality of target nodes meeting that a difference between property information values of any two nodes is within a preset range in the initial knowledge graph are determined. In response to the target map elements including target edges, a plurality of target edges having a same type of property information between any two nodes in the initial knowledge graph are determined.

The preset range may be self-set. Different preset ranges may be set according to different types of property information. For example, when the type of the property information is time, the preset range of differences between times is within 1 minute, or within 2 minutes and the like. For another example, when the type of the property information is space, the preset range of differences between spaces is within 100 square meters and the like. For example, in FIG. 2b, s1 and s2 are the target nodes, s3 and s4 are the target nodes, s5 and s7 are the target nodes, and s6 and s7 are the target nodes.

In FIG. 2b, the types of the property information of three edges between s1 and P1 are time, then the three edges are the target edges. Similarly, the two edges between P1 and s2 are the target edges, the two edges between P2 and s3 are the target edges, the two edges between P2 and s5 are the target edges, and the two edges between P3 and s7 are the target edges.

At block S230, the plurality of the target map elements are merged to generate a knowledge graph.

For example, when the target nodes and the target edges are merged, the target nodes may be merged first, and then the target edges may be merged; or, the target edges may be merged first, and then the target nodes may be merged.

Figure 2C:
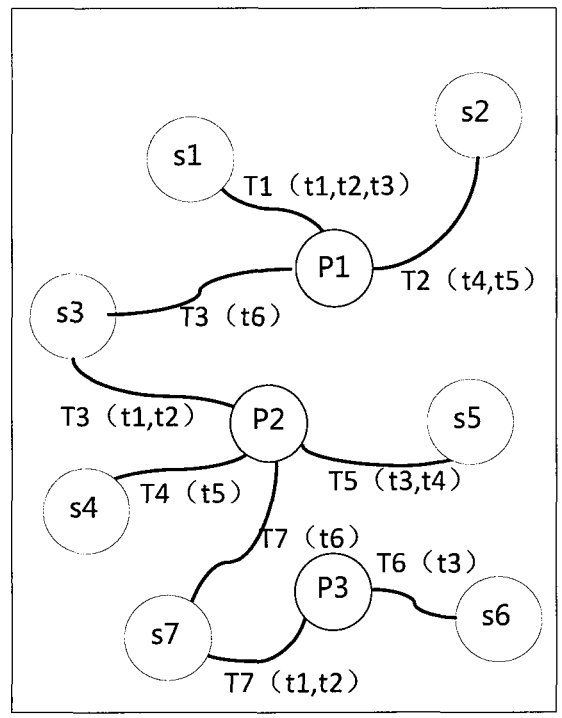
FIG. 2c is a schematic diagram of edge merging of an initial knowledge graph according to an embodiment of the present disclosure.

Taking merging the target edges first as an example, FIG. 2c is a schematic diagram of merging edges on an initial knowledge graph according to an embodiment of the present disclosure. In FIG. 2c, the target edges in FIG. 2b are merged. The target edges are recorded at block S220. The merged edge stores the property information of each target edge in an adjacency table. The format of the adjacency table is K(V), K is an identifier of the merged edge, represented in the format of T+number, and V is the property information of each target edge, the adjacency table is illustrated in FIG. 2c.

Figure 2D:
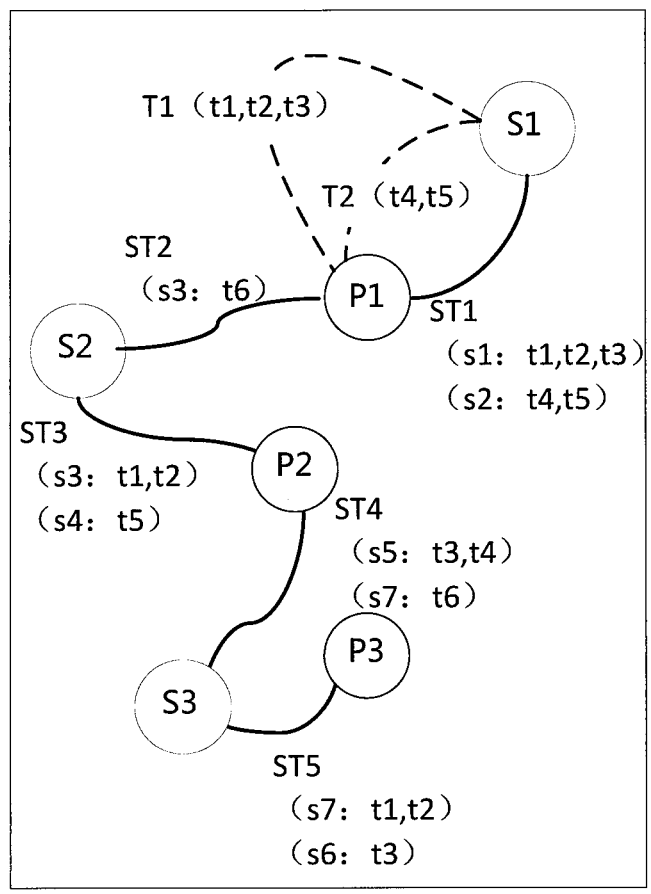
FIG. 2d is a schematic diagram of node merging on a knowledge graph after edge merging according to an embodiment of the present disclosure.

FIG. 2d is a schematic diagram of merging nodes on a knowledge graph after merging edges according to an embodiment of the present disclosure. In FIG. 2d, the target edges in FIG. 2c are merged, and the target nodes are recorded at block S220. The edges connected to respective target nodes are also connected to the merged node. It is worth noting that after the target nodes are merged, a plurality of target edges need to be merged continuously when the plurality of target edges with the same property information type between the two nodes are reappeared. Thus, the target nodes and the target edges are merged alternately, thereby ensuring the knowledge graph to be fully compressed. In detail, after merging the target nodes s1 and s2, S1 is obtained, and there are two target edges, which are represented by dashed lines, between S1 and P1, and then the two target edges are merged to obtain an edge, which is represented by a thick solid line. The merged node stores the property information of the edges connected to respective target nodes in the adjacency table. The format of the adjacency table is KV, K is the identifier of the merged edge, represented in the format of ST+number, and V is an identifier of each target node and the property information of edges connected to respective target nodes, the adjacency table is illustrated in FIG. 2d.

In an application scenario, the same mobile hotspot (WIFI) device collects a large amount of information of the same person. In this case, a large amount of edge information between this person and this WIFI device may be formed. These edges are merged into one edge, and the property information such as the connecting time between the person and the WIFI device is recorded on the property of the edge, thereby avoiding existence of a large number of edges and compressing a scale of the knowledge graph.

In another application scenario, there are a large number of WIFI devices in a certain shop, and each WIFI device connects a large number of persons. In this case, there will be a large number of nodes and edges. All WIFI devices in the shop may be merged into one node. In this way, subsequent analysis is not affected, a process of the analysis is simplified, and the scale of the entire knowledge graph may be further compressed.

At block S240, a super node is determined from the knowledge graph, and the number of edges connected to the super node exceeds a preset value.

After merging the target map elements, the super node connected with a large number of edges may exist. When analyzing the super node, a long tail phenomenon and a timeout phenomenon may occur.

Figure 2E:
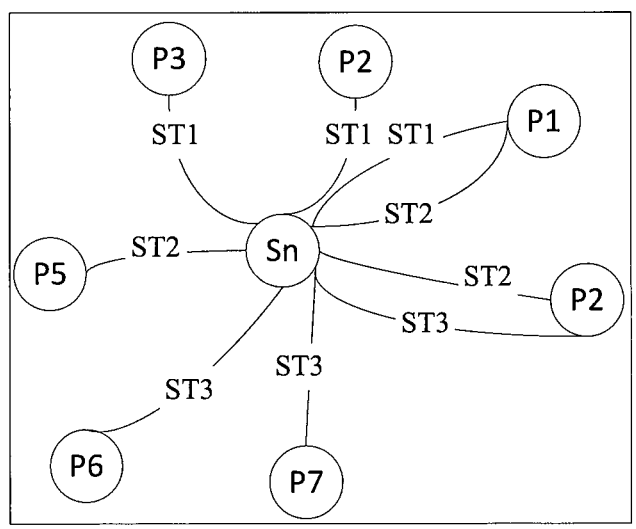
FIG. 2e is a schematic diagram of a super node according to an embodiment of the present disclosure.

The preset value may be self-set, such as 100 and 500. The number of edges connected to each node in the knowledge graph are calculated, and the node with the number of edges exceeding the preset value is determined as the super node. FIG. 2e is a schematic diagram of a super node according to an embodiment of the present disclosure. The super node is represented by Sn and connected with 9 edges and 7 nodes. The property information of the edges is stored in the adjacency table. For simplicity, the adjacency table only shows K, that is, the identifier of the edge, expressed in the format of ST+number. ST represents space-time property information, and the number represents the value of property information.

At block S250, the edges connected to the super node are divided into a plurality of edge sets according to property information of the edges connected to the super node.

In detail, the super node is divided according to the type or the value of the property information of the connected edges. For example, each edge having the same type of property information is classified into one edge set, or each edge whose value of property information is within the same preset range is classified into one edge set. For example, when the preset ranges include 8 o'clock to 12 o'clock and 12 o'clock to 15 o'clock, then each edge whose time range is within the preset range of 8 o'clock to 12 o'clock is classified into one edge set, and each edge whose time range is within the preset range of 12 o'clock to 15 o'clock is classified into one edge set.

At block S260, the super node is divided into a corresponding number of nodes based on the number of the edge sets, and edges in each edge set are connected to each node.

Figure 2F:
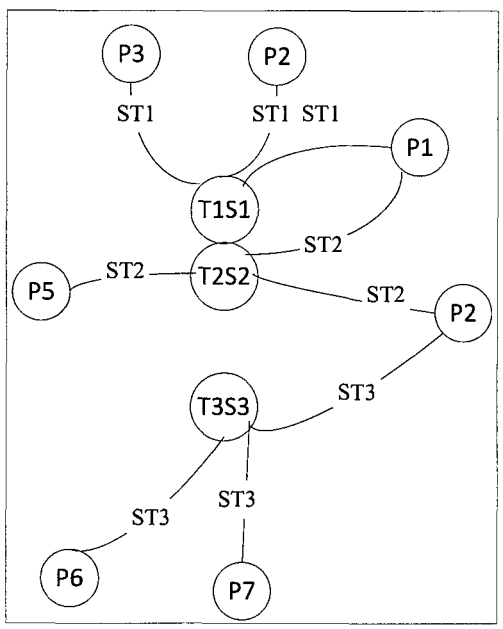
FIG. 2f is a schematic diagram of divided nodes according to an embodiment of the present disclosure.

FIG. 2f is a schematic diagram of divided nodes according to an embodiment of the present disclosure. Each edges having the same value of the space-time property information is classified into one edge set, that is, the edges having the property information values of ST1, ST2, and ST3 are classified into three different edge sets respectively. Thus, the super node is divided into three nodes, and an identifier of each divided node is determined according to the value of the space-time property information of the edge for distinguishing. The identifiers of three divided nodes illustrated in the FIG. 2f are respectively S1T1, S2T2 and S3T3. Next, the edge set composed of edges having the property information value of ST1 is connected to S1T1 node, the edge set composed of edges having the property information value of ST2 is connected to S2T2 node, and the edge set composed of edges having the property information value of ST3 is connected to S3T3 node.

In this embodiment, with dividing the super node, a large number of edges are allocated to respective nodes, thereby improving access timeliness and avoiding the long tail phenomenon and the timeout phenomenon.

In this embodiment, with merging the nodes meeting that the difference between the property information values of any two nodes is within the preset range and merging the edges having the same type of property information between any two nodes, when the knowledge graph is applied to business scenarios such as dynamic relation mining, the nodes meeting that the difference between the property information values of any two nodes is within the preset range and the edges having the same type of property information between any two nodes are obtained at one time, which is beneficial to simplify operations. Meanwhile, the merging method provided in this embodiment is more in line with actual application scenarios, so as to avoid merging irrelevant nodes or edges.

Figure 3A:
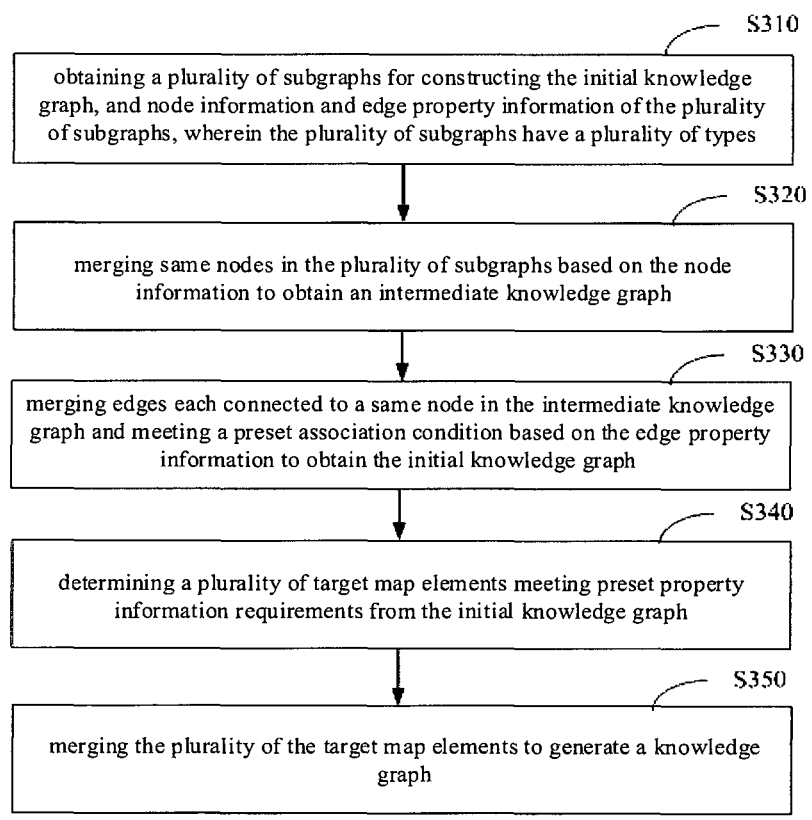
FIG. 3a is a flowchart of a method for generating a knowledge graph according to a third embodiment of the present disclosure.

In the embodiments of the present disclosure, FIG. 3a is a flowchart of a method for generating a knowledge graph according to a third embodiment of the present disclosure. This embodiment is further implemented based on the above embodiment.

For example, "obtaining an initial knowledge graph" includes "obtaining a plurality of subgraphs for constructing the initial knowledge graph, and node information and edge property information of the plurality of subgraphs, in which the plurality of subgraphs have a plurality of types; merging same nodes in the plurality of subgraphs based on the node information to obtain an intermediate knowledge graph; and merging edges each connected to a same node in the intermediate knowledge graph and meeting a preset association condition based on the edge property information to obtain the initial knowledge graph", which provides a method for generating an initial knowledge graph.

FIG. 3a is a flowchart of a third method for generating a knowledge graph according to an embodiment of the present disclosure. The method includes the followings.

At block S310, a plurality of subgraphs for constructing the initial knowledge graph, and node information and edge property information of the plurality of subgraphs are obtained.

At block S320, same nodes in the plurality of subgraphs are merged based on the node information to obtain an intermediate knowledge graph.

The same node may appear in different types of subgraphs. For example, when a node abstracted based on a certain user appears in a social relation subgraph and an account relation subgraph, this same node is merged. However, edges connecting with this same node in different types of subgraphs require to be retained.

Respective nodes in the plurality of subgraphs are traversed, the same nodes in every two subgraphs are merged to obtain the knowledge graph, which is called the intermediate knowledge graph. It is understandable that the intermediate knowledge graph does not have the same nodes, but fuses different nodes in the plurality of subgraphs, and retains all edges.

At block S330, edges each connected to a same node in the intermediate knowledge graph and meeting a preset association condition are merged based on the edge property information to obtain the initial knowledge graph.

Respective edges connected by the same node are traversed and the property information of respective edges are obtained. The edges meeting the preset association condition are merged. Correspondingly, the other two nodes corresponding to the two merged edges also require to be merged. In actual operation, the other two nodes are represented by one node, but the information and property information of the original two nodes are retained.

For example, the preset association condition includes, but is not limited to, time property information or spatial property information of edges being approximate, amount of transferring money property information of edges being approximate and the property information of edges having confidentiality.

Taking the property information having the confidentiality as an example, two edges each having the confidentiality are merged to obtain the knowledge graph. Assuming that in the intermediate knowledge graph, node 5 connecting to node 6 indicates user A transferring money to user B, and the property information of the corresponding edge is anonymous transfer. Node 5 connecting to node 7 indicates user A calling user C, and the property information of the corresponding edge is that a phone number is invisible. It may be seen that the property information of the two edges connected to node 5 both have confidentiality, and the two edges are merged. Correspondingly, node 6 and node 7 are also merged, and the merged node simultaneously represents information of user B and user C.

According to target property information of the edges, the edges connected to the same node in the intermediate knowledge graph and meeting that a difference between the values of the target property information of every two edges is within the preset range are merged to obtain the knowledge graph. The target property information includes at least one of time property information and spatial property information. The preset range may be flexibly set according to an actual situation, a difference in time may be 10 or 30 minutes, and a difference in the spatial may be 10 or 50 meters. It is assumed that node 8 being connected to the node 9 means camera A having captured face 1, and the property information of the corresponding edge is at ten o'clock and at a central avenue. Node 8 being connected to node 10 means camera A having captured face 2, and the property information of the corresponding edge is at five past ten o'clock and at the central avenue. It can be seen that the time property information of the two edges connected to the node 8 is close, and the spatial property information is the same, then the two edges connected to the node 8 are merged. Correspondingly, the node 9 and the node 10 are also merged, and the merged node simultaneously represents the information of face 1 and face 2.

Figure 3B:
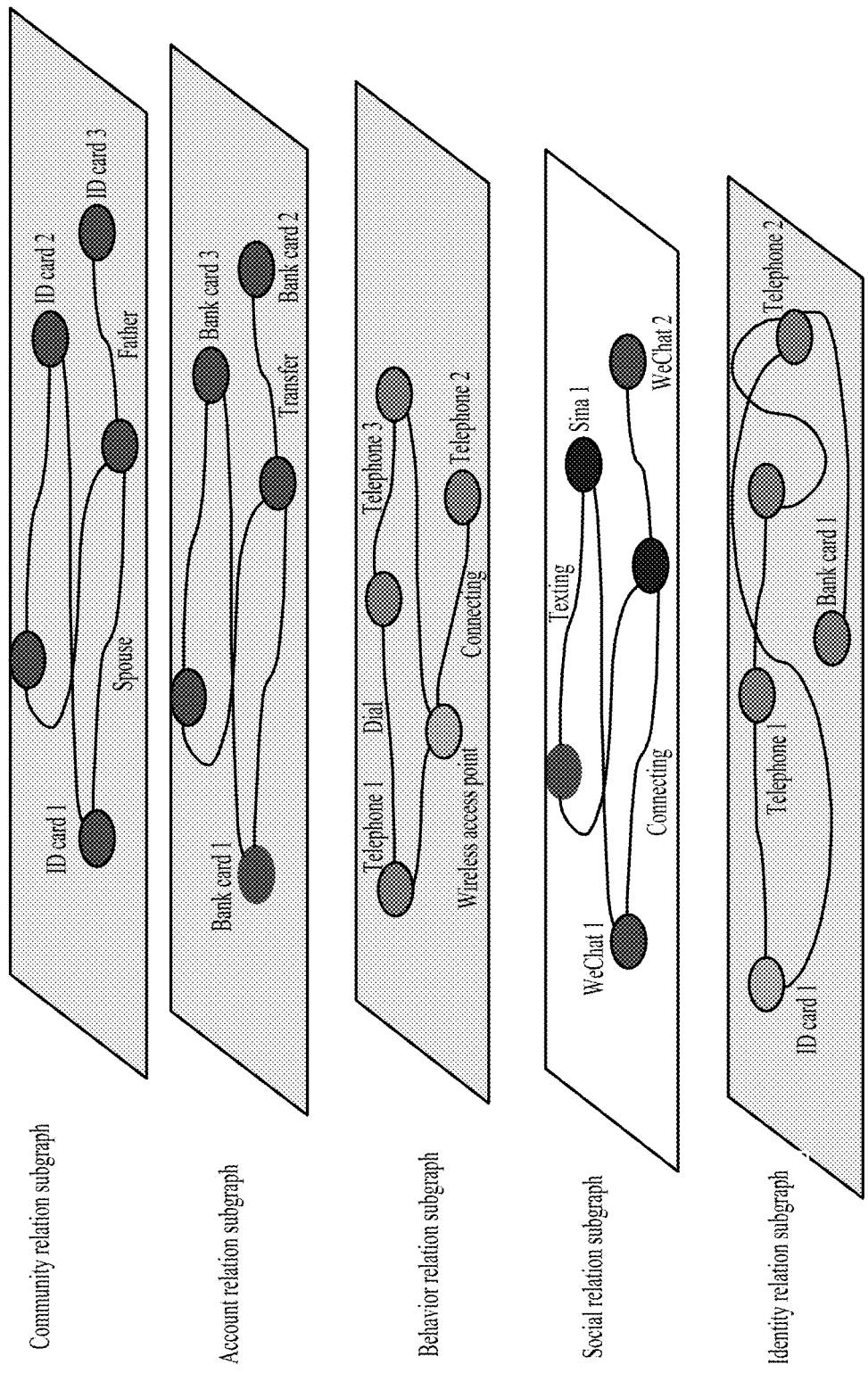
FIG. 3b is a schematic diagram of a sub-graph according to an embodiment of the present disclosure.

Furthermore, in this embodiment, each sub-graph corresponds to one type. FIG. 3b illustrates five subgraphs, which are respectively a community relation subgraph, an account relation subgraph, a behavior relation subgraph, a social relation subgraph, and an identity relation subgraph. In each subgraph, nodes are obtained by abstracting from entities, and edges are obtained by abstracting from relations between the entities. For example, a certain node represents information such as an identity of a user, or persons, events, places, and objects associated with the user. The edges represent the relation between the user and other users.

The information of each node in each subgraph is a unique identifier of the node, which may be represented by names of the node. Edge property information includes but is not limited to time property information, spatial property information, membership property information, and grade property information. In an example, information corresponding to a mobile phone is recorded by a certain base station, it is recorded as a set of point-edge relations "node 1: mobile phone 1; node 2: base station; edge between node 1 and node 2: mobile phone connecting to the base station, edge property information: time, frequency". In another example, an account transfers money to another account, it is recorded as a set of node-edge relations "node 3: account A; node 4: account B; edge between node 1 and node 2: transferring money, edge property information: time of transferring money, amount of transferring money, direction of transferring money".

Figure 3C:
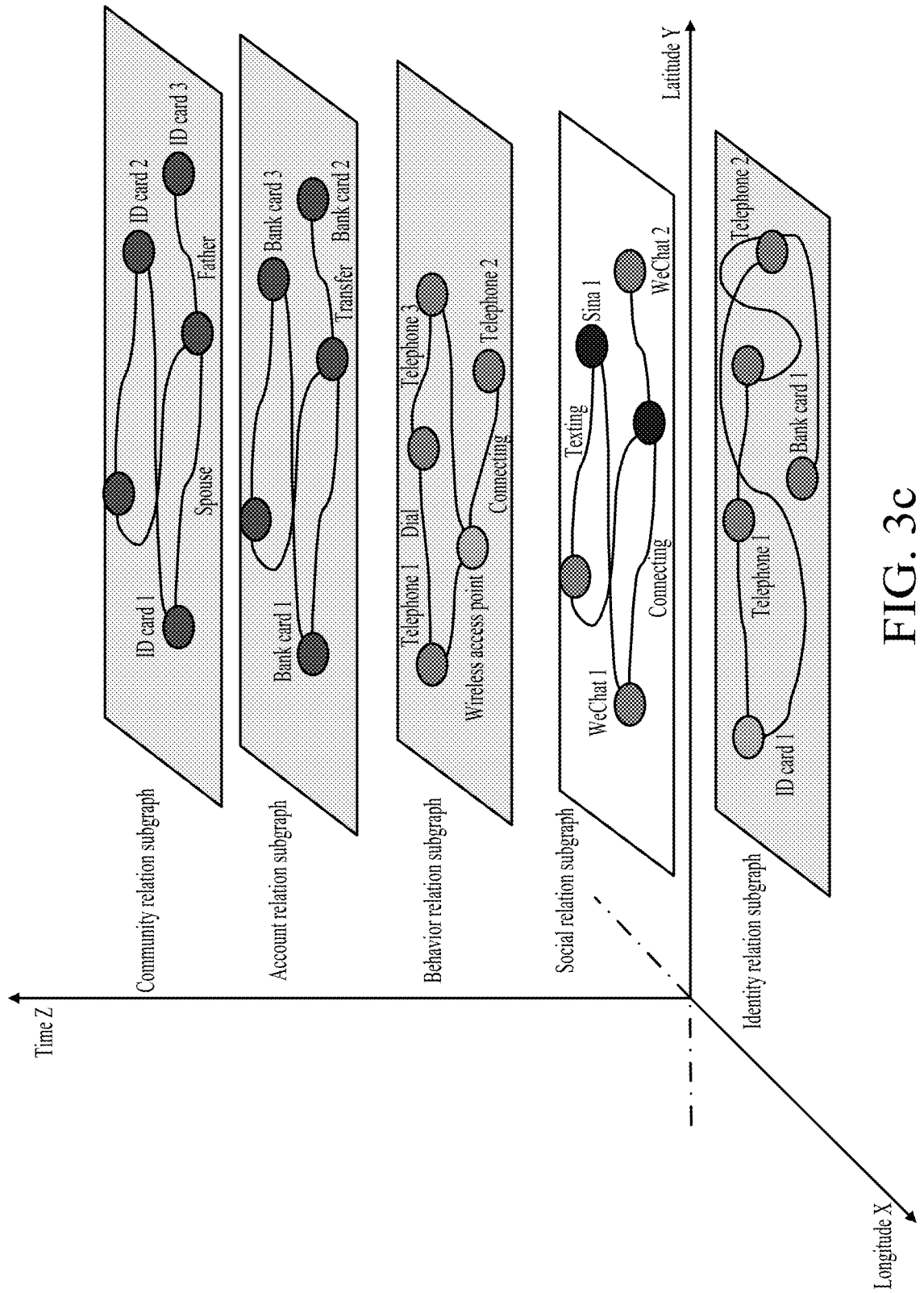
FIG. 3c is a schematic diagram of a plurality of sub-graphs projected on a space-time coordinate system according to an embodiment of the present disclosure.

In actual operations, a plurality of sub-graphs are projected on a space-time coordinate system, as illustrated in FIG. 3c. Some relations may not have time property information and/or spatial property information, then the time property information and/or spatial property information of both nodes of the relation may be as the time property information and/or spatial property information of the relation, thus the relations may be represented better and the relations with similar properties are merged to generate the knowledge graph.

Figure 3D:
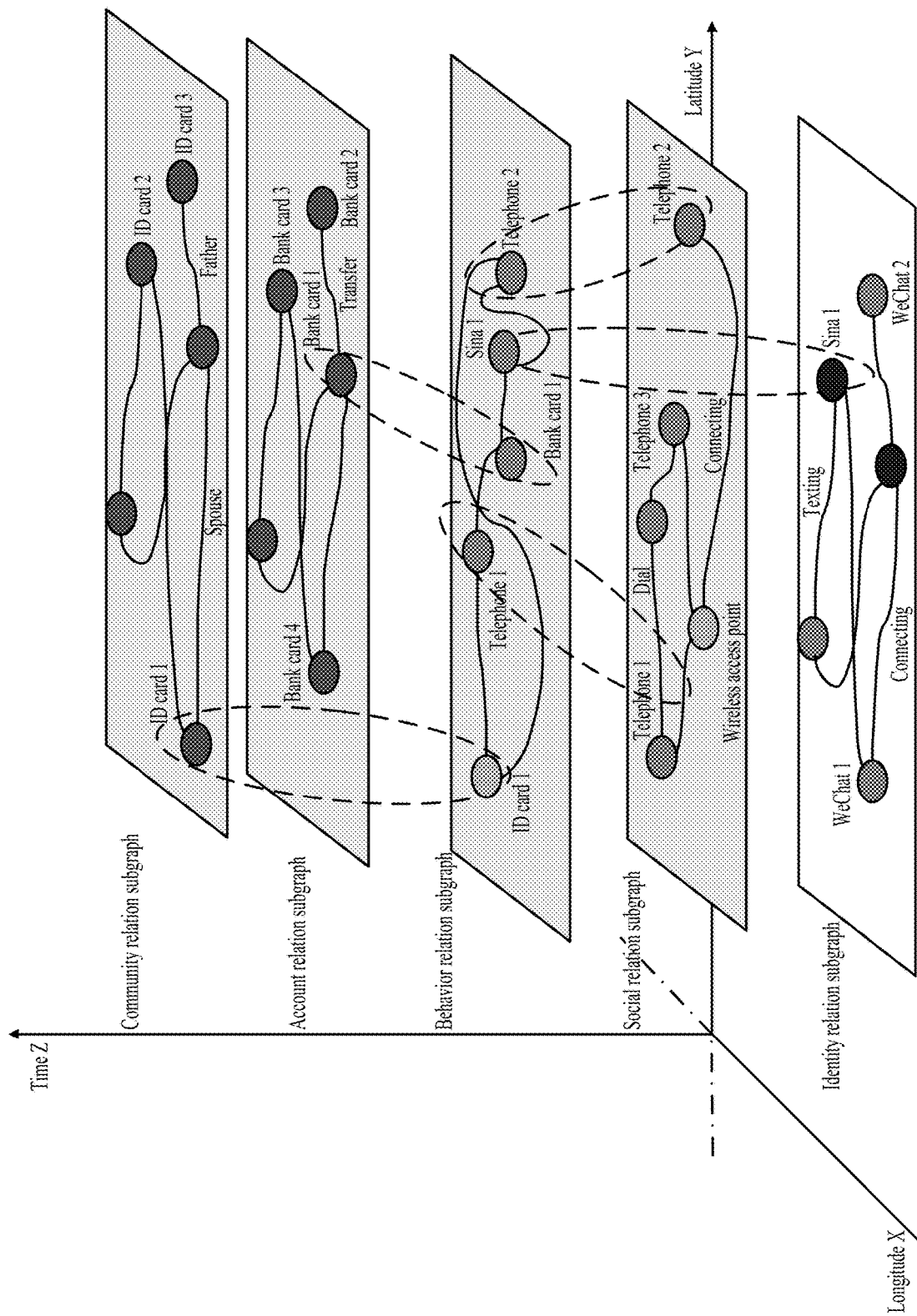
FIG. 3d is a schematic diagram of same nodes in a plurality of subgraphs in a space-time coordinate system according to an embodiment of the present disclosure.

Then, utilizing a plurality of subgraphs projected on the same space-time coordinate system, the same nodes may be merged. As illustrated in FIG. 3d, dashed lines circle some of the same nodes.

Figure 3E:
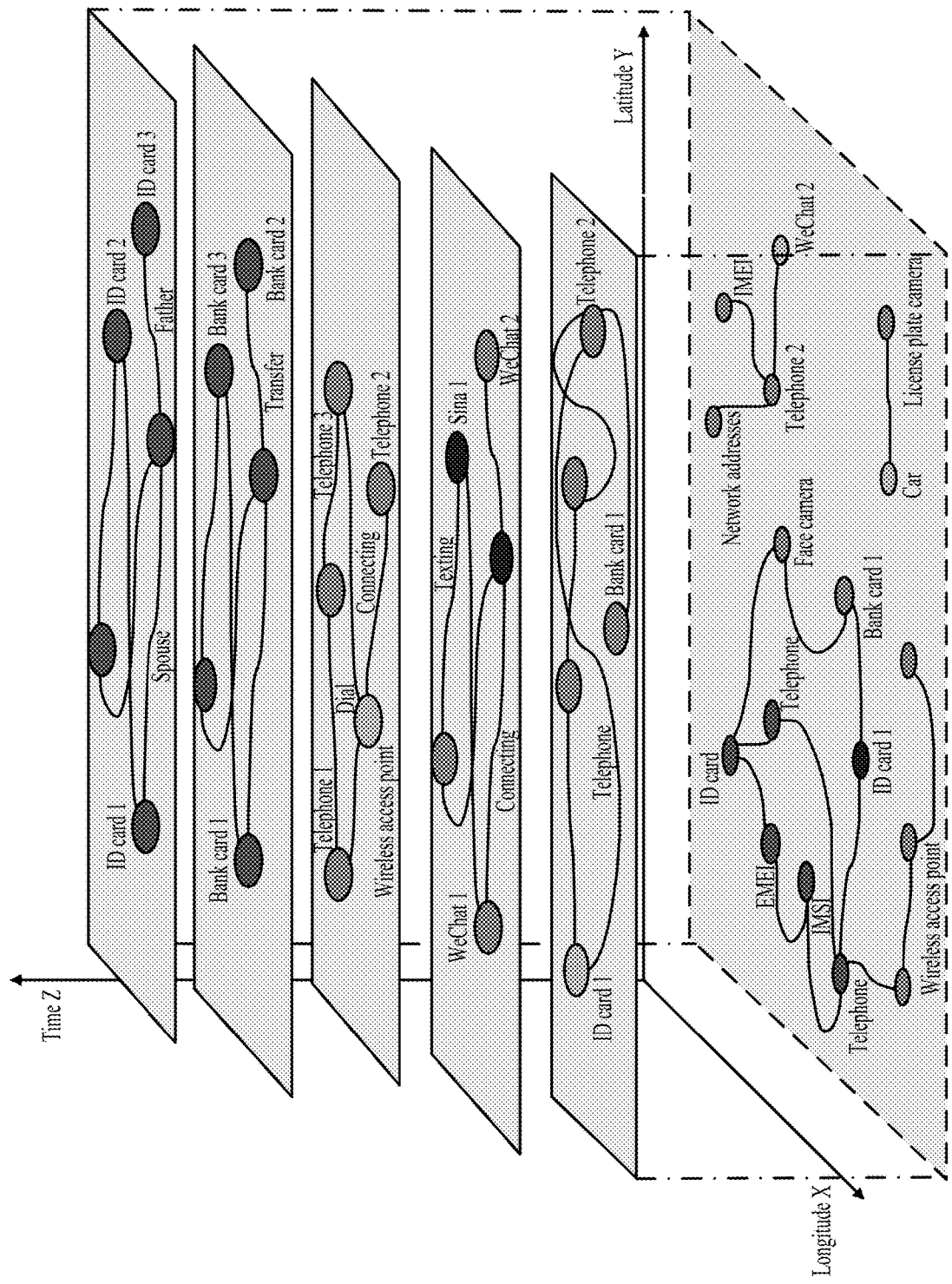
FIG. 3e is a schematic diagram of an initial knowledge graph according to an embodiment of the present disclosure.

Then, all subgraphs are projected on a same layer plane. The layer plane is fitted with time-space properties. Accordingly, the edges connected to the same node with similar time property information or similar spatial property information are automatically merged, as illustrated in FIG. 3e. In this way, a relatively complete knowledge graph, which is called the initial knowledge graph, may be constructed. In FIG. 3e, International Mobile Subscriber Identification Number (IMSI) is an identifier of a mobile user for distinguishing. IMEI is an abbreviation of International Mobile Equipment Identity.

At block S340, a plurality of target map elements meeting preset property information requirements are determined from the initial knowledge graph.

At block S360, the plurality of the target map elements are merged to generate a knowledge graph.

The embodiments of the present disclosure realize to merger a plurality of types of subgraphs by merging the same nodes in the plurality of types of subgraphs, and initially integrates cross-type information. The edges connected to the same node and meeting the preset association condition are merged, which realizes full integration of cross-type information, effectively mines deep-level information and avoid information missing and key evidence chains breaking, such that the knowledge graph may play an effective role when applied to business scenarios such as dynamic relation mining.

For example, after the block S330, the method includes: in response to the initial knowledge graph having isolated subgraphs, searching for nodes having an association relation in respective isolated subgraphs, and connecting the nodes having the association relation through a virtual node. The nodes between the isolated subgraphs are not directly connected. It is necessary to mine which nodes have an internal association relation, and then connect these nodes. A completely connected knowledge graph is formed through making the isolated subgraphs connecting, thereby ensuring that nodes may be reachable between each other, and further realizing information integration.

Searching for the nodes having the association relation in respective isolated subgraphs may include the following two implementations.

In a first implementation, target property information of nodes in the isolated subgraphs are obtained, nodes in the isolated subgraphs having differences between values of the target property information within a preset range are determined as the nodes having the association relation based on the target property information of the nodes. The target property information includes at least one of time property information and spatial property information. Some nodes may not have time property information and/or space property information, and the time property information and/or space property information of the corresponding connecting edges may be taken as the time property information or space property information of the nodes. Similarly, the preset range may be flexibly set according to the actual situation.

In a second implementation, nodes having common information in the isolated subgraphs are obtained. The common information includes the same identity information. For example, a face camera subgraph includes a camera 1 node and a captured face node, and a license plate probe subgraph includes a camera 2 node and a captured license plate node. A communication subgraph includes a mobile phone number 1 node and mobile phone number 2 node. After projecting onto the same layer plane, these three subgraphs are all isolated subgraphs. It may be known that the face, the license plate and the mobile phone number 1 are all associated with a certain ID number, therefore, the face node, the license plate node and the mobile phone number 1 node are pointed to the virtual node, then a relation between the face, license plate and mobile phone number is obtained, and the three subgraphs are connected accordingly. In other examples, the common information may also include the same membership information or the same legal person information, such as, belonging to a certain organization or group, or having the same legal person. This embodiment does not make specific limitations on the common information.

It is worth noting that the above first implementation and the above second implementation may be executed either or both. When the first implementation and the second implementation are executed both, an executing order of the two implementations is not limited. When the first implementation and the second implementation are executed either, the appropriate one is selected according to executability of the two implementations. For example, when the nodes in respective isolated subgraphs do not have the common information, the first implementation may be tried to execute.

Further, after searching for the nodes having the association relation, the nodes having the association relation are connected through the virtual node.

Figure 3F:
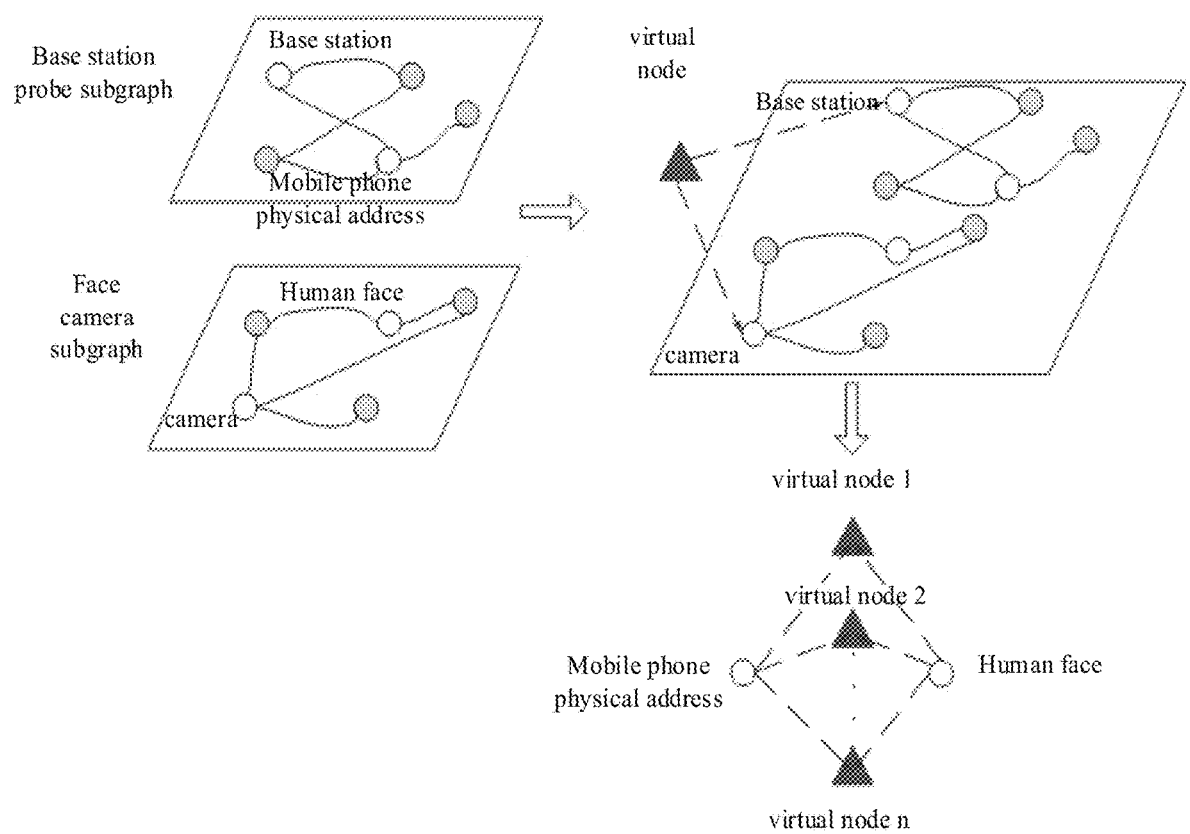
FIG. 3f is a schematic diagram of a newly added virtual node connecting a base station node and a camera node according to an embodiment of the present disclosure.

As illustrated in FIG. 3f, a base station probe subgraph includes a base station node and a detected mobile phone physical address node. The face camera subgraph includes a camera node and a captured face node. After projecting the nodes onto the same layer plane, there are isolated subgraphs. It is found through searching that the time property information of the base station node and the camera node are similar, and the spatial property information is also similar, so the base station node and the camera node are the nodes having the association relation.

As illustrated in FIG. 3f, after connecting the base station node and the camera node, the mobile phone physical address node and the captured face node are also connected, thereby mining the deep-level relation between the mobile phone physical address and the face.

Figure 3G:
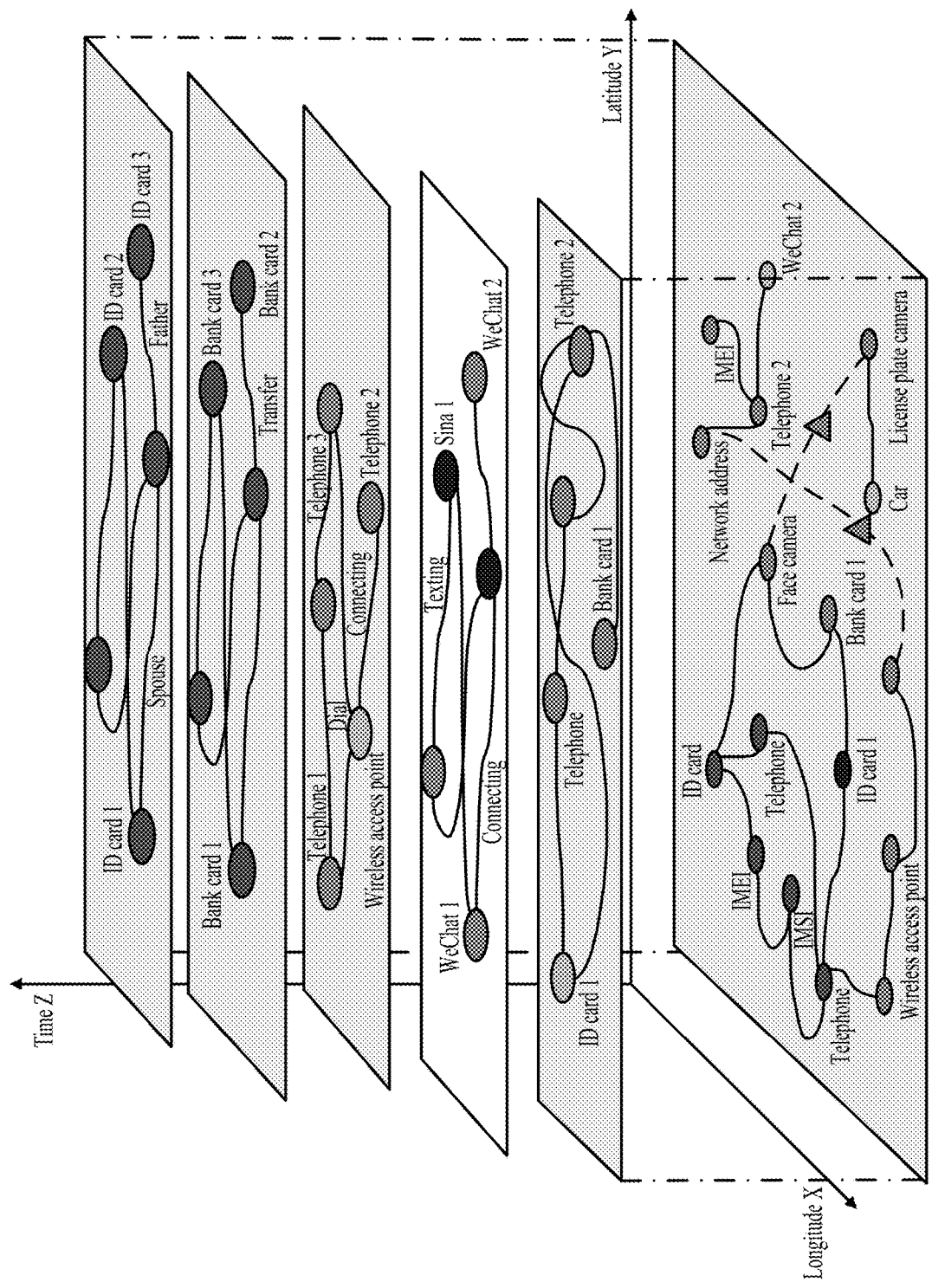
FIG. 3g is a schematic diagram of a newly added virtual node connected to isolated subgraphs in a space-time coordinate system according to an embodiment of the present disclosure.

As illustrated in FIG. 3g, after projecting the nodes onto the same layer plane, the isolated subgraphs are connected by the virtual node. The virtual node is represented by a triangle symbol.

In this embodiment, with merging nodes having at least one of the similar time property information and the similar spatial property information in different isolated subgraphs, different isolated subgraphs are connected utilizing the nodes having at least one of the similar time property information and the similar spatial property information. Therefore, the similar time property information and the similar spatial property information between isolated subgraphs are fully mined, a new association relation is constructed, and deep-level data mining is realized. With connecting nodes having the common information in different isolated subgraphs, different isolated subgraphs are connect utilizing the common information, therefore, full mining of the common information is achieved.

For example, obtaining a plurality of subgraphs for constructing the knowledge graph includes: obtaining a plurality of types of entity information and direct relations between entities; abstracting each type of entity information into a node and the direct relations between entities into edges and constructing a corresponding type of subgraph; merging or connecting nodes having an association relation in the corresponding type of subgraph, thereby achieving integration and connection of the nodes and the relations in the subgraph.

In a real social scenario, the relations between entities may be described in a variety of ways, which includes structured data, unstructured data, semi-structured data, and may also include various multimodal data such as text, video, audio and image. The relations are not only limited to relations between persons, but also include persons and things, and things and things and other multiple dimensions. All the relations are abstracted into three dimensions, which are respectively entity information, direct relations between entity information, and property information. These three dimensions correspond to nodes, edges, and property information of the nodes and edges, respectively. Meanwhile, in order to extract corresponding entity information, relations and property information from various structured, unstructured and semi-structured multi-source heterogeneous multimodal data, the following methods are provided.

Figure 3H:
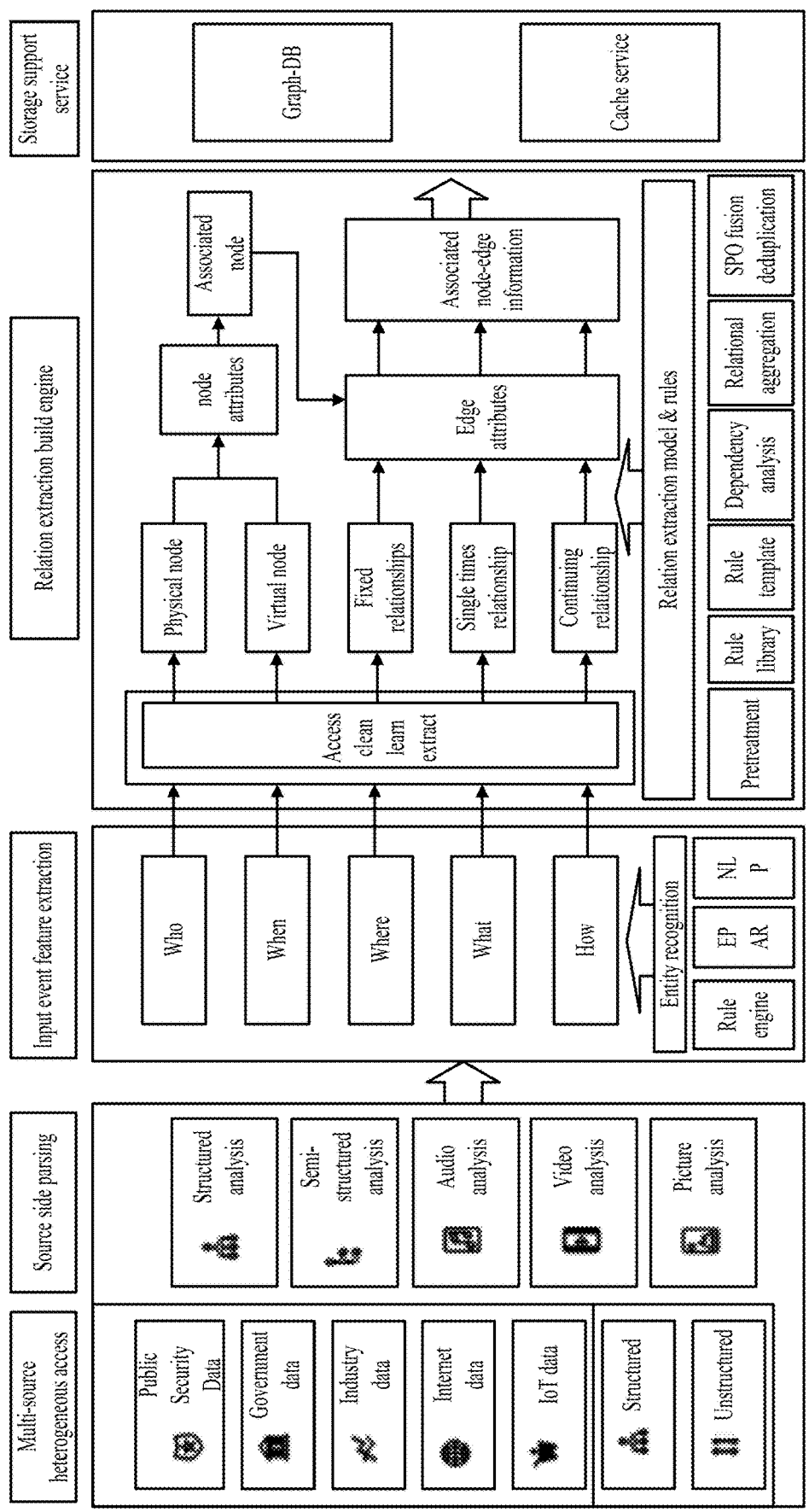
FIG. 3h is a schematic diagram of constructing a framework of an initial knowledge graph according to an embodiment of the present disclosure.

FIG. 3h is a schematic diagram of constructing a framework of an initial knowledge graph according to an embodiment of the present disclosure. As illustrated in FIG. 3h, firstly, source-side analysis is performed on the accessed multi-source heterogeneous data. The analysis methods include structured analysis, semi-structured analysis, audio analysis, video analysis and image analysis. Then the analyzed data is used to generate manners of 4WH (Who, When, Where and What) and How based on source-side modeling. Methods of the source-side modeling include: rule engine, Entity-Property-Action-Relation (EPAR) modeling and Natural Language Processing (NLP) platform modeling, so as to extract the corresponding entity information and property information.

Secondly, corresponding relations are obtained from the analyzed data by using and processing techniques such rule templates in the rule base, dependency relation analysis, relation aggregation and Subject-Predication-Object (SPO) triple relation extraction. SPO fusion and eliminating duplicates are performed on the corresponding relation to extract the relation. In FIG. 3h, the extracted relations include fixed relations, single times relations and continuous relations.

Next, the 4WH and How is processed by data cleaning, understanding and extracting, and may access the knowledge graph to abstract as the nodes and the property information of the nodes in the knowledge graph. The extracted relation is abstracted as the edges between nodes and the property information of the edges. When there are isolated subgraphs in the knowledge graph, nodes having the association relation between the subgraphs (i.e., associated nodes) are searched, and the associated nodes are connected through the virtual node. In order to distinguish the abstracted nodes (i.e., the associated nodes) from the virtual node, the abstracted nodes are called entity nodes. Further, combined with the property information of the associated nodes and the edges, the associated nodes are associated with the property information of the edges of the associated nodes and abstracted as nodes having the property information of the associated nodes and the property information of the edges.

It is worth noting that when obtaining the nodes and the edges in the knowledge graph, each type of subgraph is obtained first. In detail, each type of entity information is abstracted as a node, and the direct relations between entities are abstracted as the edges to construct a corresponding type of subgraph. The nodes having the association relation in the corresponding type of subgraph are merged or connected to realize the integration and connection of the nodes and the relations in the subgraph.

It should be noted that the direct relations between entities refers to the relations directly obtained from the data source, without reasoning and analysis. For example, when a camera captures a license plate, the camera has a direct relation with the license plate. For example, when a user purchases an item, the user has a direct relation with the item.

In an example, a subgraph is constructed based on all mobile phone-related records, another subgraph is constructed based on entities related to biological characteristics. Still another subgraph is constructed based on vehicle-related entities. Yet another subgraph is constructed based on account-related entities. Yet another subgraph is constructed based on entities related to ID cards.

It is worth noting that the nodes having the association relation here do not have any direct relation, that is, are not directly connected. In this block, nodes that are not directly connected are connected or merged. For example, node 11 and node 12 are relatives, node 12 and node 13 are relatives, then node 11 and node 13 are also relatives, node 11 and node 13 are connected to realize the connection of the two nodes. For example, someone has two mobile phone numbers, and each mobile phone number node has its own calling behavior, then the two mobile phone number nodes are merged into one to achieve node integration. Correspondingly, the calling behavior of the two mobile phone numbers are connected, that is, the relation is generated.

In this case, the advantage is that all the relations in the same subgraph are fully integrated, which may avoid the key evidence chains breaking due to subsequent information missing, such as missing a mobile phone number, or missing the relations between node 11 and node 12, and fail to obtain anomaly analysis results.

It should be noted that when a node is a merged node, information and property information of original nodes are required to be retained, and when an edge is obtained through connecting nodes having the association relation, the property information of the nodes having the association relation may be regarded as the property information of the edge.

Then, according to the information of the nodes, the same nodes in the plurality of subgraphs are merged to obtain the intermediate knowledge graph. According to the property information of the edges, the edges connected to the same node in the intermediate knowledge graph and meeting the preset association condition are merged to obtain the initial knowledge graph. Finally, a storage support service, such as Graph-DB or cache service is used to store the initial knowledge graph.

Figure 4:
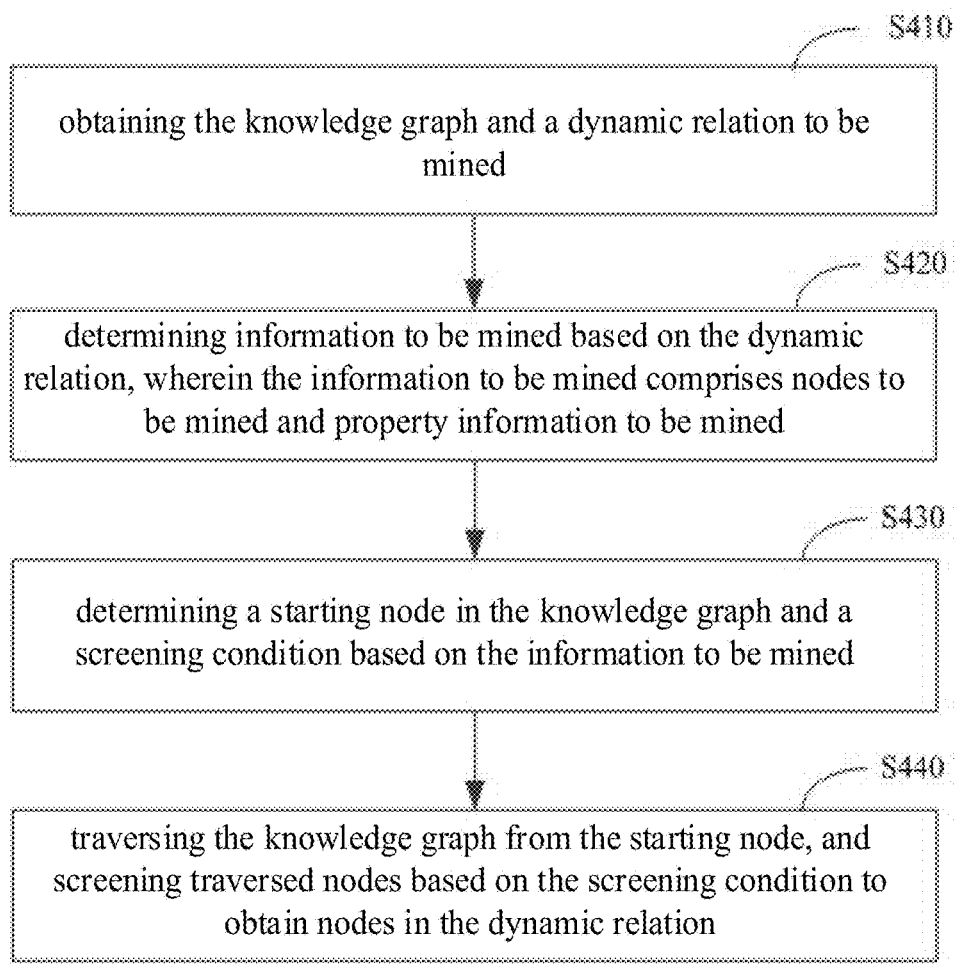
FIG. 4 is a flowchart of a method for relation mining based on a knowledge graph according to a first embodiment of the present disclosure.

In embodiments of the present disclosure, FIG. 4 is a flowchart of a method for relation mining based on a knowledge graph according to a first embodiment of the present disclosure. This embodiment is applicable to a case for performing dynamic relation mining on the knowledge graph provided by the foregoing embodiments. The method is executed by an apparatus for relation mining based on a knowledge graph, which is implemented in software and/or hardware, and is integrated into an electronic device. For example, the electronic device may be a terminal or a server. As illustrated in FIG. 4, a method for relation mining based on a knowledge graph according to this embodiment may include the followings.

At block S410, the knowledge graph and a dynamic relation to be mined are obtained.

The knowledge graph in this embodiment is a knowledge graph provided by any one of the foregoing embodiments. In the knowledge graph, at least one of the nodes and edges meeting the preset property requirements is merged respectively. For example, the knowledge graph is a connected graph, and without isolated subgraphs.

Dynamic relation is a relation that dynamically changes along changes of time, space, entity and other information. For example, the dynamic may be association retrieval, line expansion analysis, point property research and study and determination, edge property research and determination, association analysis, association reasoning, group mining, ad-hoc analysis, and same car relation, a traveling together relation and a space-time collision relation.

At block S420, information to be mined is determined based on the dynamic relation, the information to be mined includes nodes to be mined and property information to be mined.

Generally, in the related art, surveillance cameras and WIFI devices are adopted to mine dynamic relations. In this embodiment, on the basis of the knowledge graph, the problem of mining dynamic relations is transformed into a problem of graph traversal. On the basis, the node information is determined according to the entities in the dynamic relation, and the property information is determined according to the relation in the dynamic relation. In order to facilitate description and distinction, the nodes and property information determined according to the dynamic relation are respectively called the nodes to be mined and the property information to be mined. The property information to be mined is used as the property information of the nodes or the property information of the edges.

For example, when the dynamic relation is the same car relation, it is determined that the nodes to be mined include person nodes and vehicle nodes, and the property information to be mined includes time property information and spatial property information.

At block S430, a starting node in the knowledge graph and a screening condition are determined based on the information to be mined.

At block S440, the knowledge graph is traversed from the starting node, and traversed nodes are screened based on the screening condition to obtain nodes in the dynamic relation.

The starting node may be any node in the knowledge graph, such as the starting node may be a node obtained after dividing a super node, a merged node, a virtual node or other nodes. The starting node may be the node to be mined or the node with the property information to be mined. The knowledge graph is traversed from the starting node to obtain the traversed nodes. This embodiment does not limit the traversal method, which may be depth-first traversal or breadth-first traversal. In this embodiment, the number of traversal steps is not limited, which may be 1, 2, or 3. The traversed nodes may be the nodes traversed at the last step, the nodes traversed at respective steps, or nodes including the starting node and the node traversed at respective steps.

It should be noted that the traversal of the knowledge graph is similar to the traversal of a tree. The traversal refers to access to the information of at least all nodes in the graph, that is, each node is accessed in sequence once and only once.

The screening condition is a condition for screening the traversed nodes, such that each screened node is consistent with the information to be mined, for example, the screened node is the node to be mined, the screened node has the property information to be mined, or a traversal path of the screened node has the property information to be mined. The traversal path includes an edge directly connected or edges indirectly connected between the screened node and the starting node.

In this embodiment, with determining the information to be mined according to the dynamic relation, the problem of mining the dynamic relation is transformed into the problem of graph traversal on the basis of the knowledge graph obtained by merging at least one of the nodes and edges. With determining the starting node in the knowledge graph and the screening condition according to the information to be mined, and traversing the knowledge graph from the starting node, the starting node is accurately found in the merged knowledge graph for traversal, and the traversed nodes are screened according to the screening condition. Since the knowledge graph is merged in advance, the nodes and edges may express more property information, and a structure of the graph is small enough, so the graph may be traversed from the starting node, and the traversed nodes are screened to find nodes in the dynamic relation. Therefore, it is no required to process the full amount of nodes, and the method is applied to the dynamic relation mining of the online knowledge graph, which is a simple analysis process has a small amount of calculation and a short response duration.

Figure 5A:
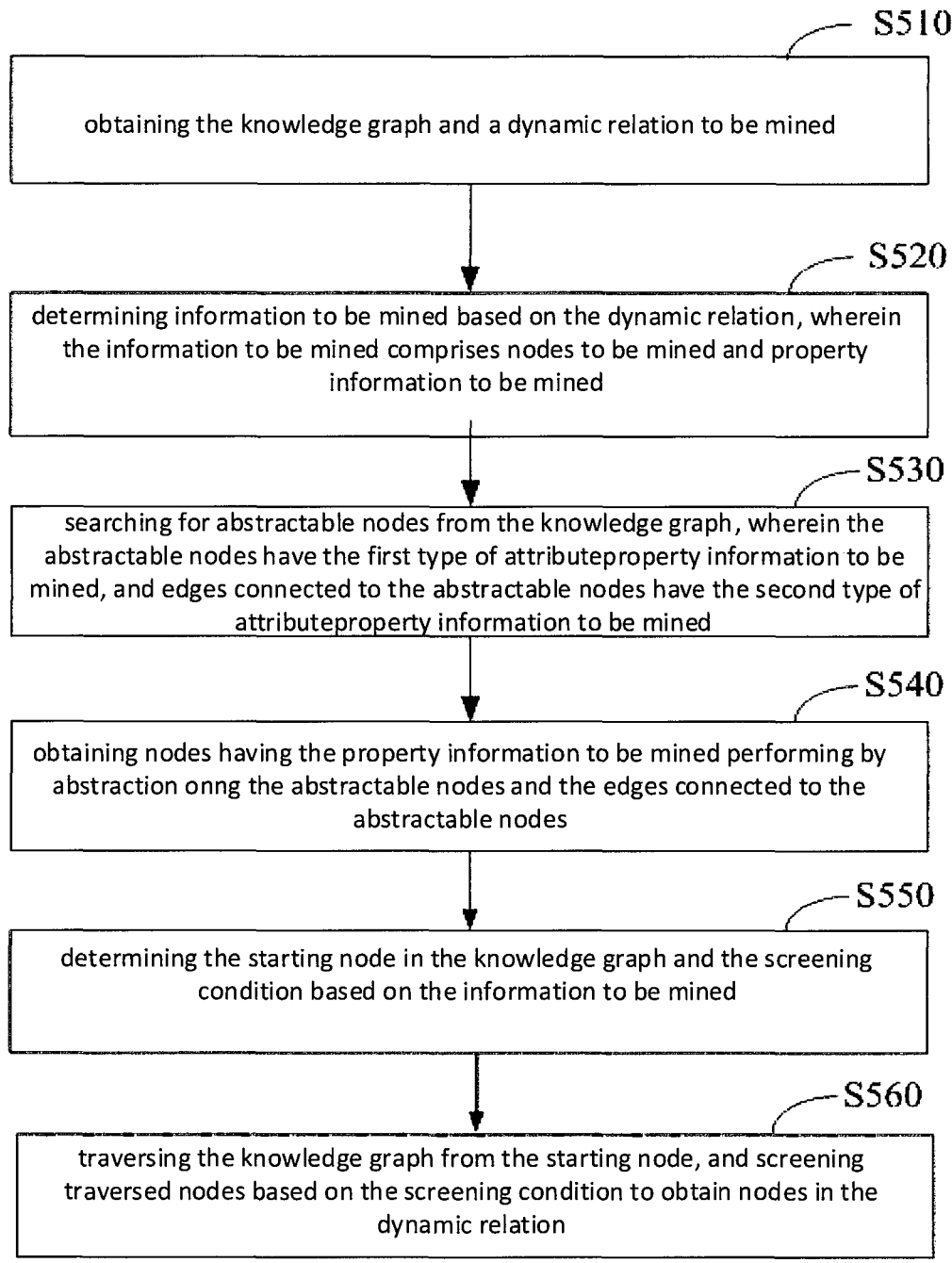
FIG. 5a is a flowchart of a method for relation mining based on a knowledge graph according to a second embodiment of the present disclosure.

In this embodiment, FIG. 5a is a flowchart of a method for relation mining based on a knowledge graph according to a second embodiment of the present disclosure. This embodiment further describes based on the above embodiment.

For example, before "determining the starting node in the knowledge graph and the screening condition based on the information to be mined", "searching for abstractable nodes from the knowledge graph, in which the abstractable nodes have the first type of property information to be mined, and edges connected to the abstractable nodes have the second type of property information to be mined; and obtaining nodes having the property information to be mined by abstracting the abstractable nodes and the edges connected to the abstractable nodes", so as to merge node and edge.

The method for relation mining based on a knowledge graph in FIG. 5a includes the followings.

At block S510, the knowledge graph and a dynamic relation to be mined are obtained.

At block S520, information to be mined is determined based on the dynamic relation, the information to be mined includes nodes to be mined and property information to be mined.

At block S530, abstractable nodes are searched from the knowledge graph, the abstractable nodes have the first type of property information to be mined, and edges connected to the abstractable nodes have the second type of property information to be mined.

The property information to be mined includes a first type of property information to be mined and a second type of property information to be mined. For example, the first type of property information to be mined is time property information, and the second type of property information to be mined is spatial property information. For convenience of description, the node having the first type of property information to be mined and its connected edge having the second type of property information to be mined is called the abstractable node. The edges connected to the abstractable node may either be one edge or two edges.

At block S540, nodes having the property information to be mined are obtained by abstracting the abstractable nodes and the edges connected to the abstractable nodes.

Figure 5B:
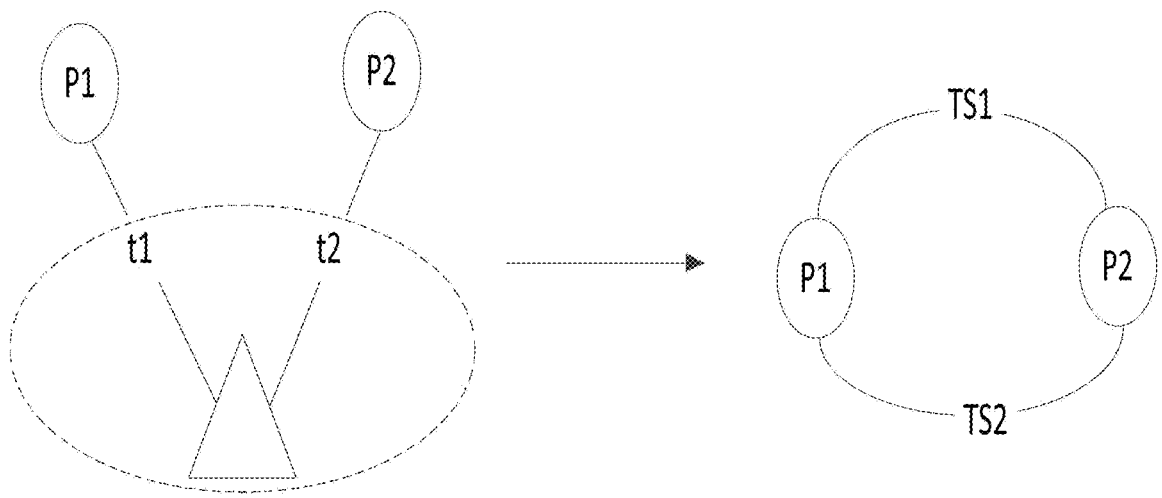
FIG. 5b is a schematic diagram of abstracting abstractable nodes and edges according to an embodiment of the present disclosure.

FIG. 5b is a schematic diagram of abstracting abstractable nodes and edges according to an embodiment of the present disclosure. In FIG. 5b, the abstractable node is a virtual node, represented by a triangle symbol, and having the spatial property information. The edges connecting the virtual node with node P1 and node P2 have the time property information, respectively represented as t1 and t2. Then the virtual node and the edge with t1 property information are abstracted as node TS1, and the virtual node and the edge with t2 property information are abstracted as node TS2, as shown in FIG. 5b.

For example, a node connected to the abstractable node may be reconnected to the abstracted node. For example, in FIG. 5b, the node P1 and the node P2 connected to the virtual node are reconnected to the node TS1 and the node TS2, thereby ensuring that connection relations remain unchanged.

At block S550, the starting node in the knowledge graph and the screening condition are determined based on the information to be mined.

At block S560, the knowledge graph is traversed from the starting node, and traversed nodes are screened based on the screening condition to obtain nodes in the dynamic relation.

In this embodiment, when the property information to be mined is distributed on the nodes and the edges connected by the nodes, the nodes and edges are abstracted, such that the abstracted nodes have the complete property information to be mined. Therefore, in the process of mining dynamic relation, only the nodes are considered instead of the edges, and efficiency of mining dynamic relation is improved.

Figure 6:
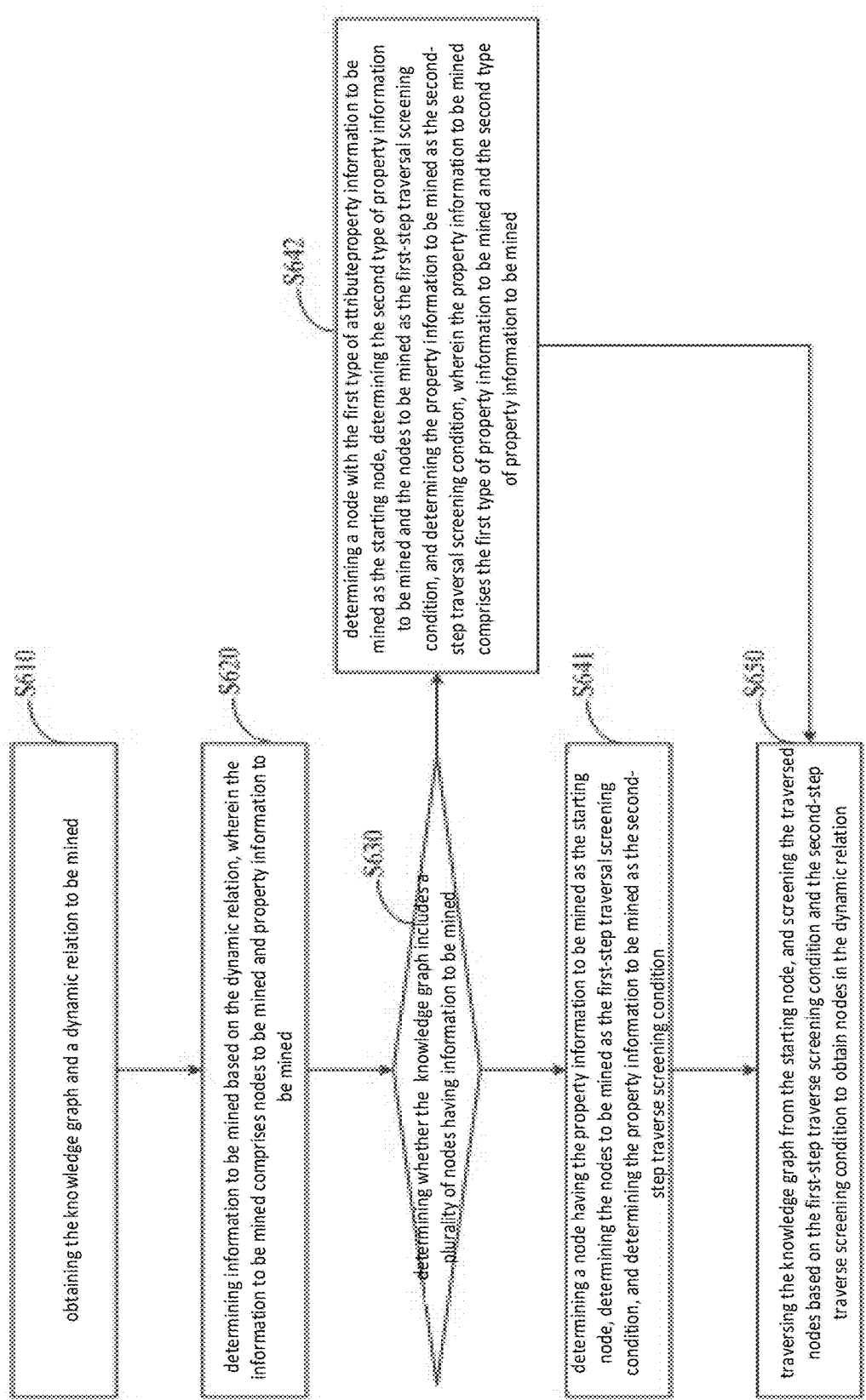
FIG. 6 is a flowchart of a method for relation mining based on a knowledge graph according to a third embodiment of the present disclosure.

In the embodiments of the present disclosure, FIG. 6 is a flowchart of a method for relation mining based on a knowledge graph according to a third embodiment of the present disclosure. This embodiment further describes on the basis of the foregoing embodiments.

For example, "determining the starting node in the knowledge graph and the screening condition based on the information to be mined" is described in detail as "determining a node having the property information to be mined as the starting node, determining the nodes to be mined as a first-step traversal screening condition, and determining the property information to be mined as a second-step traverse screening condition; or, determining a node with the first type of property information to be mined as the starting node, determining the second type of property information to be mined and the nodes to be mined as the first-step traversal screening condition, and determining the property information to be mined as the second-step traversal screening condition, wherein the property information to be mined comprises the first type of property information to be mined and the second type of property information to be mined".

FIG. 6 is a flowchart of a method for relation mining based on a knowledge graph according to a third embodiment of the present disclosure. The method includes the followings.

At block S610, the knowledge graph and a dynamic relation to be mined are obtained.

At block S620, information to be mined is determined based on the dynamic relation, the information to be mined includes nodes to be mined and property information to be mined.

At block S630, whether a node with property information to be mined exists in the knowledge graph is determined. If yes, S641 is executed, if no, S642 is executed.

For example, the number of the type of property information to be mined may be at least one. On the basis, when the number of the type of property information to be mined is one, it is determined whether the property information to be mined exists in the knowledge graph. When the property information to be mined exists in the knowledge graph, S641 is executed, and when the property information to be mined does not exist in the knowledge graph, this operation is ended.

When the number of the type of property information to be mined is more than two, it is determined whether all types of property information to be mined exist in the knowledge graph, when all types of property information to be mined exist in the knowledge graph, S641 is executed, and when any one type of property information to be mined does not exist in the knowledge graph, S642 is executed.

At block S641, a node having the property information to be mined is determined as the starting node, the nodes to be mined is determined as the first-step traversal screening condition, and the property information to be mined is determined as the second-step traverse screening condition. Then S650 is executed.

In a first application scenario, the dynamic relation is the space-time collision relation. In detail, two or more space-time nodes are given, and persons appearing at these space-time nodes at the same time are mined. The nodes to be mined include nodes representing identity information of the persons, such as face nodes, mobile phone nodes and vehicle nodes. The property information to be mined includes time property information and spatial property information corresponding to each space-time node.

In detail, the node with the time property information and spatial property information corresponding to the space-time node is determined as the starting node, the node representing the identity information of the person is determined as the first-step traversal screening condition, and the time property information and the spatial property information corresponding to other space-time nodes is determined as the second-step traversal screening condition.

For example, the starting node may be an original node in the knowledge graph, or the abstracted node in the foregoing embodiment.

At block S642, a node with the first type of property information to be mined is determined as the starting node, the second type of property information to be mined and the nodes to be mined are determined as the first-step traversal screening condition, and the property information to be mined is determined as the second-step traversal screening condition, the property information to be mined includes the first type of property information to be mined and the second type of property information to be mined. Then S650 is continuously executed.

In a second application scenario, the dynamic relation is the space-time collision relation. In detail, more than two space-time nodes are given, and persons appearing at these space-time nodes at the same time are mined. The nodes to be mined include nodes representing identity information of the persons, such as face nodes, mobile phone nodes and vehicle nodes. The property information to be mined includes the time property information and the spatial property information corresponding to each space-time node.

In detail, the node with the spatial property information corresponding to a space-time node is determined as the starting node, and the time property information corresponding to the space-time node and the node representing the identity information of the person are determined as the first-step traversal screening condition. The time property information and the spatial property information corresponding to other space-time nodes. are determined as the second-step traversal screening condition.

At block S650, the knowledge graph is traversed from the starting node, and the traversed nodes are screened based on the first-step traversal screening condition and the second-step traversal screening condition to obtain nodes in the dynamic relation.

For example, after the knowledge graph is traversed after two steps traversal from the starting node, the nodes traversed after the first-step traversal are screened based on the first-step traversal screening condition, and then the nodes screened after the first-step traversal are obtained. Afterwards, the nodes screened after the first-step traversal are re-screened based on the second-step traversal screening condition to obtain the nodes in the dynamic relation.

For example, in order to reduce the number of nodes to be traversed and to improve screening efficiency, the traversed nodes are screened after each traversal. In detail, the knowledge graph is traversed starting from the starting node to obtain the nodes traversed after the first-step traversal, the nodes traversed after the first-step traversal are screened based on the first-step traversal screening condition to obtain a candidate node, and the second-step traversal is performed on the knowledge graph starting from the candidate node to obtain nodes traversed after the second-step traversal. Finally, the nodes traversed after the second-step traversal are screened based on the second-step traversal screening condition to obtain the nodes in the dynamic relation.

In the first application scenario, starting from the node with the time property information and spatial property information corresponding to the time-space node, the first-step traversal is performed on the knowledge graph to obtain the nodes traversed after the first-step traversal. The nodes that represent the identity information of the persons are screened from the nodes traversed after the first-step traversal. The second-step traversal is performed on the knowledge graph starting from the node representing the identity information of the person (that is, the candidate node) to obtain the nodes traversed after the second-step traversal. Nodes with the time property information and the spatial property information corresponding to other time-space nodes are screened from the nodes traversed after the second-step traversal, and nodes that are respectively connected to the initial node (or the initially starting node) and the finally screened node and represent the identity information of the persons are obtained. Through the two steps traversal from time-space to person to time-space and screening, the persons appearing at these time-space nodes at the same time are obtained.

In the second application scenario, the knowledge graph is traversed starting from the node with the spatial property information corresponding to a space-time node to obtain the nodes traversed after the first-step traversal. Nodes that represent the identity information of the persons and have the traversal paths with time property information corresponding to the time-space node are screened from the nodes traversed after the first-step traversal. The knowledge graph is traversed starting from the screened node (that is, the candidate node) to obtain the nodes traversed after the second-step traversal. The nodes traversed after the second-step traversal are screened to obtain the screened nodes, such that the screened nodes have time property information and spatial property information corresponding to other space-time nodes, or, the nodes traversed after the second-step traversal are screened to obtain the screened nodes, such that the screened nodes have spatial property information corresponding to other space-time nodes and traversal paths between the screened nodes and the candidate node have time property information corresponding to other space-time nodes. In this way, the nodes that are respectively connected to the initial node (or the initially starting node) and the finally screened node and represent the identity information of the persons are obtained. Therefore, through the two steps traversal of time-space to person to time-space and screening, the persons appearing at these time-space nodes at the same time are obtained.

This embodiment provides a method for determining starting nodes and screening conditions, which is suitable for mining of nodes to be mined associated with property information to be mined. When the property information to be mined includes the time property information and the spatial property information, and the nodes to be mined may represent the identity information of the person, the method is applied to the mining of the time-space collision relation. Since the knowledge graph is pre-merged, the nodes and edges may express more property information, and the structure of the graph is small enough, so after the two steps of traversal, the amount of calculation is greatly reduced. Moreover, even if the property information to be mined changes, the updated nodes may be fed back in time, therefore real-time analysis is supported.

Figure 7:
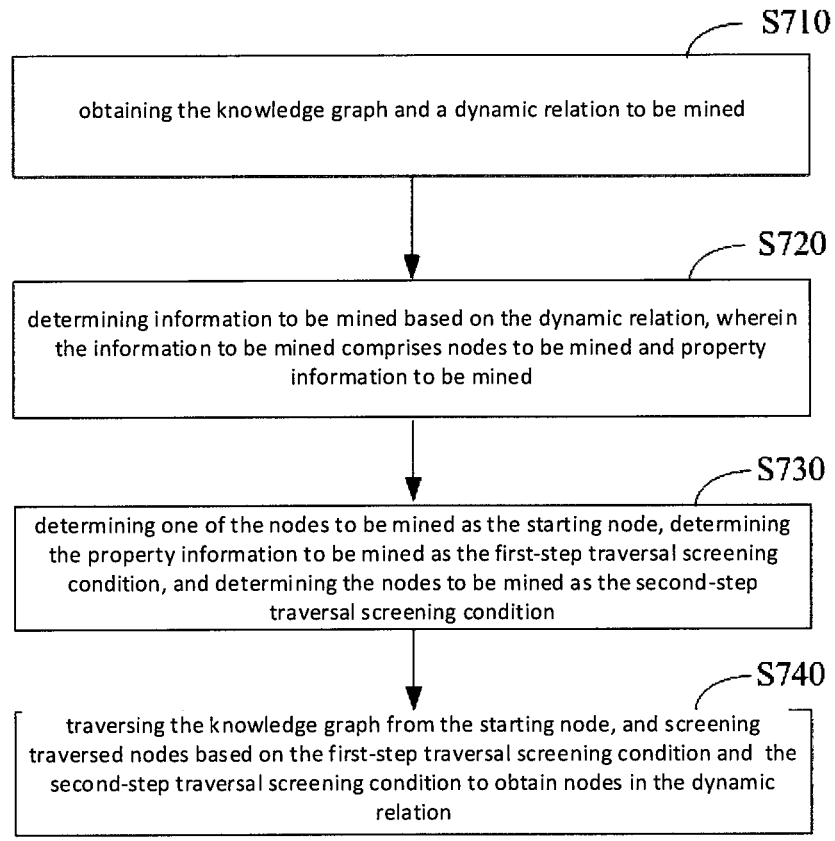
FIG. 7 is a flowchart of a method for relation mining based on a knowledge graph according to a fourth embodiment of the present disclosure.

In this embodiment, FIG. 7 is a flowchart of a method for relation mining based on a knowledge graph according to a fourth embodiment of the present disclosure. This embodiment is further described based on the above embodiments.

For example, "determining the starting node in the knowledge graph and the screening condition based on the information to be mined" is described in detail as "determining one of the nodes to be mined as the starting node, determining the property information to be mined as the first-step traversal screening condition, and determining the nodes to be mined as the second-step traversal screening condition".

The method for relation mining based on a knowledge graph in FIG. 7 includes the followings.

At block S710, the knowledge graph and a dynamic relation to be mined are obtained.

At block S720, information to be mined is determined based on the dynamic relation, the information to be mined includes nodes to be mined and property information to be mined.

At block S730, one of the nodes to be mined is determined as the starting node, the property information to be mined is determined as the first-step traversal screening condition, and the nodes to be mined are determined as the second-step traversal screening condition.

In an application scenario, the dynamic relation is a traveling together relation. In detail, one person is given, other persons who travel with that person may be mined. The nodes to be mined include nodes that nodes that represent identity information of persons, such as face nodes, mobile phone nodes, and vehicle nodes, and the property information to be mined includes the time property information and the spatial property information. It should be noted that this embodiment only limits the types of the time property information and the spatial property information, but does not limit the values of those.

In detail, the node representing the identity information of the given person is determined as the starting node, the time property information and the spatial property information are determined as the first-step traversal screening condition, and the nodes representing the identity information of the persons are determined as the second-step traversal screening condition.

At block S740, the knowledge graph is traversed from the starting node, and the traversed nodes are screened based on the first-step traversal screening condition and the second-step traversal screening condition to obtain nodes in the dynamic relation.

For example, after the knowledge graph is traversed after two steps traversal from the starting node, the nodes traversed after the first-step traversal are screened according to the first-step traversal screening condition, and then the nodes screened after the first-step traversal are obtained. The screened after the first-step traversal are re-screened according to the second-step traversal screening condition to the obtain nodes in the dynamic relation.

For example, in order to reduce the number of nodes to be traversed and to improve the screening efficiency, the traversed nodes are screened after each traversal. In detail, the first-step traversal is performed on the knowledge graph starting from the starting node to obtain the nodes traversed after the first-step traversal. The nodes traversed after the first-step traversal are screened according to the first-step traversal screening condition to obtain a candidate node. The second-step traversal is performed on the knowledge graph starting from the candidate node to obtain the nodes traversed after the second-step traversal. The nodes traversed after the second-step traversal is screened based on the second-step traversal screening condition to obtain nodes in the dynamic relation.

In the above application scenarios, the first-step traversal is performed on the knowledge graph is traversed starting from the node representing the identity information of the given person to obtain the nodes traversed after the first-step traversal. The nodes with the time properties and the spatial properties are screened from the nodes traversed after the first-step traversal. The knowledge graph is traversed starting from the screened node (i.e., the candidate node) to obtain the nodes traversed after the second-step traversal. The nodes representing the identity information of the persons screened from the nodes traversed after the second-step traversal, and the nodes that are connected to the nodes with the time properties and the spatial properties and represent the identity information of the persons are obtained. Thus, through the two steps traversal of person to time-space to person and screening, other persons traveling with the given person are obtained.

In detail, after the nodes traversed after the second-step traversal are screened, the screened nodes are merged according to the time properties and the space properties of the connected nodes, that is, other persons are merged according to the time-space nodes where other persons appear together with the given person. Other persons who appear at more than two time-space nodes with the given person are determined as persons traveling together.

For example, the nodes with the time properties and the space properties may be the original nodes in the knowledge graph, or may be the abstracted nodes in the foregoing embodiment.

This embodiment provides a method for determining a starting node and screening conditions, which is suitable for the mining of two or more nodes to be mined that are associated with the property information to be mined at the same time. When the property information to be mined includes the time property information and the spatial property information and the nodes to be mined may be the nodes representing the identity information of the person, the method may be applied to mining the traveling together relations. Since the knowledge graph is pre-merged, the nodes and edges may express more property information, and the structure of the graph is small enough, so it only takes two steps of traversal to obtain the nodes, which greatly reduces the amount of calculation. Moreover, even if the property information to be mined changes, the updated nodes may be fed back in time, therefore real-time analysis is supported.

Figure 8:
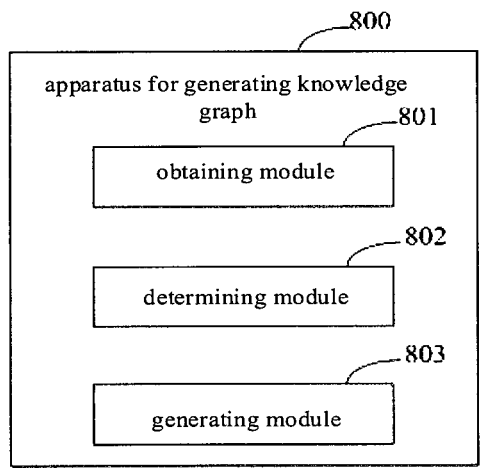
FIG. 8 is a block diagram of an apparatus for generating a knowledge graph according to an embodiment of the present disclosure.

In this embodiment, FIG. 8 is a structural diagram of an apparatus for generating a knowledge graph according to an embodiment of the present disclosure. The embodiment of the present disclosure is suitable for the case of reprocessing the initial knowledge graph. The apparatus is implemented by software and/or hardware, and is specifically configured in an electronic device with certain data computing capabilities.

As illustrated in FIG. 8, the apparatus 800 for generating a knowledge graph includes: an obtaining module 801, a determining module 802 and a generating module 803.

The obtaining module 801 is configured to obtain an initial knowledge graph, the initial knowledge graph includes a plurality of nodes having connection relationships.

The determining module 802 is configured to determine a plurality of target map elements meeting preset property information requirements from the initial knowledge graph, the target map element include target nodes, or target edges.

The generating module 803 is configured to merge the plurality of the target map elements to generate a knowledge graph.

In this embodiment, by merging at least one of a plurality of target nodes and a plurality of target edges meeting the preset property information requirements in the initial knowledge graph, the nodes and edges express more property information and improve expressive capability of the knowledge graph. Moreover, the graph structure is reduced. When the knowledge graph is applied to business scenarios such as dynamic relation mining, the analysis process is simplified, the amount of calculation is reduced, and the calculation efficiency is improved.

Optionally, the determining module 802 is configured to: in response to the target map elements including target nodes, determine a plurality of target nodes meeting that a difference between property information values of any two nodes is within a preset range in the initial knowledge graph; and in response to the target map elements including target edges, determine a plurality of target edges having a same type of property information between any two nodes in the initial knowledge graph.

Optionally, the apparatus further includes dividing module. The dividing module is configured to determine a super node from the knowledge graph, in which the number of edges connected to the super node exceeds a preset value, divide the edges connected to the super node into a plurality of edge sets according to property information of the edges connected to the super node; and divide the super node into a corresponding number of nodes based on the number of the edge sets, and connect edges in each edge set to each node.

Optionally, the obtaining module 801 includes: an obtaining unit, a first merging unit and a second merging unit. The obtaining unit is configured to obtain a plurality of subgraphs for constructing the initial knowledge graph, and node information and edge property information of the plurality of subgraphs, in which the plurality of subgraphs have a plurality of types. The first merging unit is configured to merge same nodes in the plurality of subgraphs based on the node information to obtain an intermediate knowledge graph. The second merging unit is configured to merge edges each connected to a same node in the intermediate knowledge graph and meeting a preset association condition based on the edge property information to obtain the initial knowledge graph.

Optionally, the second merging unit is configured to: merge edges each connected to a same node in the intermediate knowledge graph and meeting that differences between target property information values of the edges in the intermediate knowledge graph are within a preset range based on the target property information of the edges to obtain the initial knowledge graph, the target property information includes at least one of time property information and spatial property information.

Optionally, the apparatus further includes a connecting module. The connecting module is configured to: in response to the initial knowledge graph having isolated subgraphs, search for nodes having an association relation in respective isolated subgraphs in response to the initial knowledge graph having various isolated subgraphs, and connect the nodes having the association relation through a virtual node.

Optionally, when searching for the nodes having the association relation in the various isolated subgraphs, the connecting module specifically includes: obtaining target property information of nodes in the isolated subgraphs, the target property information includes at least one of time property information and spatial property information; determine nodes in the isolated subgraphs having differences between values of the target property information within a preset range as the nodes having the association relation, based on the target property information of the nodes; or, obtain nodes having common information in the isolated subgraphs, in which the common information includes the same identity information.

In this embodiment, the method for generating the knowledge graph according to any of the above embodiments is executed, and the corresponding technical effects are described specifically.

Figure 9:
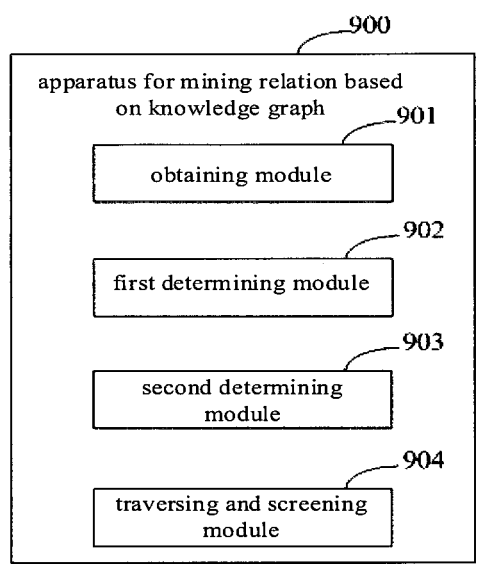
FIG. 9 is a block diagram of an apparatus for relation mining based on a knowledge graph according to an embodiment of the present disclosure.

In this embodiment, FIG. 9 is a structural diagram of an apparatus for relation mining based on a knowledge graph according to an embodiment of the present disclosure. The embodiments of this disclosure are applicable to the case of performing dynamic relation mining on the knowledge graph provided by the above embodiments. The apparatus is implemented by software and/or hardware, and is specifically configured in an electronic device with certain data computing capabilities.

The apparatus 900 for relation mining based on a knowledge graph shown in FIG. 9 includes: an obtaining module 901, a first determining module 902, a second determining module 903 and a traversing and screening module 904.

The obtaining module 901 is configured to obtain the knowledge graph and a dynamic relation to be mined.

The first determining module 902 is configured to determine information to be mined based on the dynamic relation, the information to be mined includes nodes to be mined and property information to be mined.

The second determining module 903 is configured to determine a starting node in the knowledge graph and a screening condition based on the information to be mined.

The traversing and screening module 904 is configured to traverse the knowledge graph from the starting node, and screen traversed nodes based on the screening condition to obtain nodes in the dynamic relation.

In this embodiment, the information to be mined is determined according to the dynamic relation, on the basis of the knowledge graph that has merged at least one of the nodes and edges, the problem of mining the dynamic relation is transformed into the problem of graph traversal. By determining the starting node and the screening condition in the knowledge graph according to the information to be mined, and traversing the knowledge graph from the starting node, the starting node is accurately found in the merged knowledge graph for traversal, and the traversed nodes are screened according to the screening condition. Since the knowledge graph is pre-merged, nodes and edges express more property information, and the graph structure is small enough, so the knowledge graph can be traversed from the starting node, and the traversed nodes are screened to search for nodes in dynamic relation. There is no need to process the entire amount of nodes, and it can be applied to the dynamic relation mining of the online knowledge graph, and the analysis process is simple, the calculation amount is small, and the response duration is short.

Optionally, the property information to be mined includes a first type of property information to be mined and a second type of property information to be mined. The apparatus also includes an abstracting module. The abstracting module is configured to search for abstractable nodes from the knowledge graph, in which the abstractable nodes have the first type of property information to be mined, and edges connected to the abstractable nodes have the second type of property information to be mined, and obtain nodes having the property information to be mined by abstracting the abstractable nodes and the edges connected to the abstractable nodes.

Optionally, the screening condition includes a first-step traversal screening condition and a second-step traversal screening condition. The second determining module 903 is configured to: determine a node having the property information to be mined as the starting node, determine the nodes to be mined as the first-step traversal screening condition, and determine the property information to be mined as the second-step traverse screening condition; or, determine a node with the first type of property information to be mined as the starting node, determine the second type of property information to be mined and the nodes to be mined as the first-step traversal screening condition, and determine the property information to be mined as the second-step traversal screening condition, in which the property information to be mined includes the first type of property information to be mined and the second type of property information to be mined.

Optionally, the screening condition includes a first-step traversal screening condition and a second-step traversal screening condition. The second determining module 903 is configured to determine one of the nodes to be mined as the starting node, determine the property information to be mined as the first-step traversal screening condition, and determine the nodes to be mined as the second-step traverse screening condition.

Optionally, the traversing and screening module 904 is configured to: perform the first-step traversal on the knowledge graph starting from the starting node to obtain nodes traversed after the first-step traversal; screen the nodes traversed after the first-step traversal based on the first-step traversal screening condition to obtain a candidate node; perform the second-step traversal on the knowledge graph starting from the candidate node to obtain nodes traversed after the second-step traversal; and screen the nodes traversed after the second-step traversal based on the second-step traversal screening condition to obtain the nodes in the dynamic relation.

Optionally, the node to be mined includes nodes that represents identity information of a person, and the property information to be mined includes time property information and spatial property information.

This embodiment may implement the method for relation mining based on a knowledge graph according to any one of the above embodiments, and has specific corresponding technical effects.

According to the embodiments of the present disclosure, the disclosure also provides an electronic device and a readable storage medium.

Figure 10:
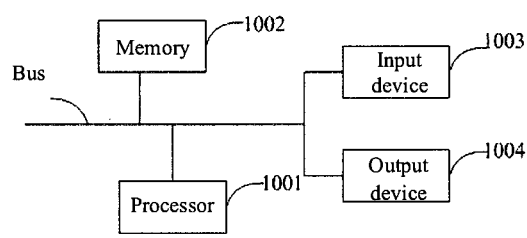
FIG. 10 is a block diagram of an electronic device used to implement the method for generating a knowledge graph or a method for relation mining based on a knowledge graph according to an embodiment of the present disclosure.

FIG. 10 is a block diagram of an electronic device used to implement the method according to an embodiment of the present disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 10, the electronic device includes: one or more processors 1001, a memory 1002, and interfaces for connecting various components, including a high-speed interface and a low-speed interface. The various components are interconnected using different buses and can be mounted on a common mainboard or otherwise installed as required. The processor may process instructions executed within the electronic device, including instructions stored in or on the memory to display graphical information of the GUI on an external input/output device such as a display device coupled to the interface. In other embodiments, a plurality of processors and/or buses can be used with a plurality of memories and processors, if desired. Similarly, a plurality of electronic devices can be connected, each providing some of the necessary operations (for example, as a server array, a group of blade servers, or a multiprocessor system). A processor 1001 is taken as an example in FIG. 10.

The memory 1002 is a non-transitory computer-readable storage medium according to the disclosure. The memory is stored with instructions executable by at least one processor, so that the at least one processor executes the method according to the disclosure. The non-transitory computer-readable storage medium of the disclosure is stored with computer instructions, which are used to cause a computer to execute the method according to the disclosure.

As a non-transitory computer-readable storage medium, the memory 1002 is configured to store non-transitory software programs, non-transitory computer executable programs and modules, such as program instructions/modules (for example, the obtaining module 801, the determining module 802, and the generating module 803 shown in FIG. 8; the obtaining module 901, the first determining module 902, the second determining module 903 and the screening module 904 shown in FIG. 9) corresponding to the method in the embodiment of the present disclosure. The processor 1001 executes various functional applications and data processing of the server by running non-transitory software programs, instructions, and modules stored in the memory 1002, that is, implementing the method in the foregoing method embodiments.

The memory 1002 may include a storage program area and a storage data area, where the storage program area may store an operating system and application programs required for at least one function. The storage data area may store data created according to the use of the electronic device for implementing the method. In addition, the memory 1002 may include a high-speed random access memory, and a non-transitory memory, such as at least one magnetic disk storage device, a flash memory device, or other non-transitory solid-state storage device. In some embodiments, the memory 1002 may optionally include a memory remotely disposed with respect to the processor 1001, and these remote memories may be connected to the electronic device for implementing the method through a network. Examples of the above network include, but are not limited to, the Internet, an intranet, a local area network, a mobile communication network, and combinations thereof.

The electronic device for implementing the method may further include: an input device 1003 and an output device 1004. The processor 1001, the memory 1002, the input device 1003, and the output device 1004 may be connected through a bus or in other manners. In FIG. 10, the connection through the bus is taken as an example.

The input device 1003 may receive inputted numeric or character information, and generate key signal inputs related to user settings and function control of an electronic device for implementing the method, such as a touch screen, a keypad, a mouse, a trackpad, a touchpad, an indication rod, one or more mouse buttons, trackballs, joysticks and other input devices. The output device 1004 may include a display device, an auxiliary lighting device (for example, an LED), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, application specific integrated circuits (ASICs), computer hardware, firmware, software, and/or combinations thereof. These various embodiments may be implemented in one or more computer programs, which may be executed and/or interpreted on a programmable system including at least one programmable processor. The programmable processor may be dedicated or general purpose programmable processor that receives data and instructions from a storage system, at least one input device, and at least one output device, and transmits the data and instructions to the storage system, the at least one input device, and the at least one output device.

These computing programs (also known as programs, software, software applications, or code) include machine instructions of a programmable processor and may utilize high-level processes and/or object-oriented programming languages, and/or assembly/machine languages to implement these calculation procedures. As used herein, the terms "machine-readable medium" and "computer-readable medium" refer to any computer program product, device, and/or device used to provide machine instructions and/or data to a programmable processor (for example, magnetic disks, optical disks, memories, programmable logic devices (PLDs), including machine-readable media that receive machine instructions as machine-readable signals. The term "machine-readable signal" refers to any signal used to provide machine instructions and/or data to a programmable processor.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, sound input, or tactile input).

The systems and technologies described herein can be implemented in a computing system that includes background components (for example, a data server), or a computing system that includes middleware components (for example, an application server), or a computing system that includes front-end components (For example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (e.g., a communication network). Examples of communication networks include: local area network (LAN), wide area network (WAN), and the Internet.

The computer system may include a client and a server. The client and server are generally remote from each other and interacting through a communication network. The client-server relation is generated by computer programs running on the respective computers and having a client-server relation with each other.

It should be understood that the various forms of processes shown above can be used to reorder, add or delete steps. For example, the steps described in the disclosure could be performed in parallel, sequentially, or in a different order, as long as the desired result of the technical solution disclosed in the disclosure is achieved, which is not limited herein.

The above specific embodiments do not constitute a limitation on the protection scope of the present disclosure. Those skilled in the art should understand that various modifications, combinations, sub-combinations and substitutions can be made according to design requirements and other factors. Any modification, equivalent replacement and improvement made within the spirit and principle of this application shall be included in the protection scope of this application.

What is claimed is:

1. A method for generating a knowledge graph, comprising:
    obtaining a plurality of subgraphs for constructing an initial knowledge graph, and node information and edge property information of the plurality of subgraphs, wherein the plurality of subgraphs have a plurality of types;
    merging same nodes in the plurality of subgraphs based on the node information to obtain an intermediate knowledge graph;
    merging edges each connected to a same node in the intermediate knowledge graph and meeting a preset association condition based on the edge property information to obtain the initial knowledge graph, wherein the initial knowledge graph comprises a plurality of nodes having connection relationships;
    determining a plurality of target map elements meeting preset property information requirements from the initial knowledge graph, wherein the target map elements comprise target nodes, or target edges; and
    merging the plurality of the target map elements to generate a knowledge graph.

2. The method according to claim 1, wherein determining the plurality of the target map elements meeting the preset property information requirements from the initial knowledge graph comprises:
    in response to the target map elements comprising target nodes, determining a plurality of target nodes meeting that a difference between property information values of any two nodes is within a preset range in the initial knowledge graph; and
    in response to the target map elements comprising target edges, determining a plurality of target edges having a same type of property information between any two nodes in the initial knowledge graph.

3. The method according to claim 1, after merging the plurality of the target map elements to generate the knowledge graph, the method further comprising:
    determining a super node from the knowledge graph, wherein the number of edges connected to the super node exceeds a preset value;
    dividing the edges connected to the super node into a plurality of edge sets according to property information of the edges connected to the super node; and
    dividing the super node into a corresponding number of nodes based on the number of the edge sets, and connecting edges in each edge set to each node.

4. The method according to claim 1, wherein merging the edges each connected to the same node in the intermediate knowledge graph and meeting the preset association condition based on the edge property information to obtain the initial knowledge graph, comprises:
merging edges each connected to the same node in the intermediate knowledge graph and meeting that differences between target property information values of the edges are within a preset range based on the target property information of the edges to obtain the initial knowledge graph, wherein the target property information comprises at least one of time property information and spatial property information.

5. The method according to claim 1, wherein after merging the edges each connected to the same node in the intermediate knowledge graph and meeting the preset association condition based on the edge property information to obtain the initial knowledge graph, the method further comprises:
in response to the initial knowledge graph having isolated subgraphs, searching for nodes having an association relation in respective isolated subgraphs, and connecting the nodes having the association relation through a virtual node.

6. The method according to claim 5, wherein searching for the nodes having the association relation in respective isolated subgraphs comprises:
obtaining target property information of nodes in the isolated subgraphs, wherein the target property information comprises at least one of time property information and spatial property information;
determining nodes in the isolated subgraphs having differences between values of the target property information within a preset range as the nodes having the association relation, based on the target property information of the nodes; or,
wherein, searching for the nodes having the association relation in respective isolated subgraphs comprises:
obtaining nodes having common information in the isolated subgraphs, wherein the common information comprises the same identity information.

7. A method for relation mining based on a knowledge graph, comprising:
obtaining a knowledge graph and a dynamic relation to be mined;
determining information to be mined based on the dynamic relation, wherein the information to be mined comprises nodes to be mined and property information to be mined;
determining a starting node in the knowledge graph and a screening condition based on the information to be mined; and
traversing the knowledge graph from the starting node, and screening traversed nodes based on the screening condition to obtain nodes in the dynamic relation;
wherein the screening condition comprises a first-step traversal screening condition and a second-step traversal screening condition, traversing the knowledge graph from the starting node, and screening the traversed nodes based on the screening condition to obtain nodes in the dynamic relation comprises:
performing first-step traversal on the knowledge graph starting from the starting node to obtain nodes traversed after the first-step traversal;
screening the nodes traversed after the first-step traversal based on the first-step traversal screening condition to obtain a candidate node;
performing second-step traversal on the knowledge graph starting from the candidate node to obtain nodes traversed after the second-step traversal; and
screening the nodes traversed after the second-step traversal based on the second-step traversal screening condition to obtain the nodes in the dynamic relation.

8. The method according to claim 7, wherein the property information to be mined comprises a first type of property information to be mined and a second type of property information to be mined; and
before determining the starting node in the knowledge graph and the screening condition based on the information to be mined, the method further comprises:
searching for abstractable nodes from the knowledge graph, wherein the abstractable nodes have the first type of property information to be mined, and edges connected to the abstractable nodes have the second type of property information to be mined; and
obtaining nodes having the property information to be mined by abstracting the abstractable nodes and the edges connected to the abstractable nodes.

9. The method according to claim 7, wherein
determining the starting node in the knowledge graph and the screening condition based on the information to be mined comprises:
determining a node having the property information to be mined as the starting node, determining the nodes to be mined as the first-step traversal screening condition, and determining the property information to be mined as the second-step traverse screening condition; or,
determining a node with the first type of property information to be mined as the starting node, determining the second type of property information to be mined and the nodes to be mined as the first-step traversal screening condition, and determining the property information to be mined as the second-step traversal screening condition, wherein the property information to be mined comprises the first type of property information to be mined and the second type of property information to be mined.

10. The method according to claim 7, wherein
determining the starting node in the knowledge graph and the screening condition based on the information to be mined comprises:
determining one of the nodes to be mined as the starting node, determining the property information to be mined as the first-step traversal screening condition, and determining the nodes to be mined as the second-step traversal screening condition.

11. The method according to claim 7, wherein the nodes to be mined comprises nodes that representing identity information of a person, and the property information to be mined comprises time property information and spatial property information.

12. An electronic device, comprising:
at least one processor; and
a memory communicatively connected with the at least one processor; wherein,
the memory is stored with instructions executable by the at least one processor, and when the instructions are executed by the at least one processor, the at least one processor is configured to:
obtain a plurality of subgraphs for constructing an initial knowledge graph, and node information and edge property information of the plurality of subgraphs, wherein the plurality of subgraphs have a plurality of types; merge same nodes in the plurality of subgraphs based on the node information to obtain an intermediate knowledge graph; and merge edges each connected to a same node in the intermediate knowledge graph and meeting a preset association condition based on the edge property information to obtain the initial knowledge graph, wherein the initial knowledge graph comprises a plurality of nodes having connection relationships;

determine a plurality of target map elements meeting preset property information requirements from the initial knowledge graph, wherein the target map elements comprise target nodes, or target edges; and merge the plurality of the target map elements to generate a knowledge graph.

13. The electronic device according to claim 12, wherein the at least one processor is further configured to:
in response to the target map elements comprising target nodes, determine a plurality of target nodes meeting that a difference between property information values of any two nodes is within a preset range in the initial knowledge graph; and
in response to the target map elements comprising target edges, determine a plurality of target edges having a same type of property information between any two nodes in the initial knowledge graph.

14. The electronic device according to claim 12, wherein the at least one processor is further configured to:
after merging the plurality of the target map elements to generate the knowledge graph, determine a super node from the knowledge graph, wherein the number of edges connected to the super node exceeds a preset value; divide the edges connected to the super node into a plurality of edge sets according to property information of the edges connected to the super node; and divide the super node into a corresponding number of nodes based on the number of the edge sets, and connect edges in each edge set to each node.

15. The electronic device according to claim 12, wherein the at least one processor is further configured to:
merge edges each connected to the same node in the intermediate knowledge graph and meeting that differences between target property information values of the edges are within a preset range based on the target property information of the edges to obtain the initial knowledge graph, wherein the target property information comprises at least one of time property information and spatial property information.

16. The electronic device according to claim 12, wherein the at least one processor is further configured to:
after merging the edges each connected to the same node in the intermediate knowledge graph and meeting the preset association condition based on the edge property information to obtain the initial knowledge graph, in response to the initial knowledge graph having isolated subgraphs, search for nodes having an association relation in respective isolated subgraphs, and connecting the nodes having the association relation through a virtual node.

17. The electronic device according to claim 16, wherein the at least one processor is further configured to:
obtain target property information of nodes in the isolated subgraphs, wherein the target property information comprises at least one of time property information and spatial property information;
determine nodes in the isolated subgraphs having differences between values of the target property information within a preset range as the nodes having the association relation, based on the target property information of the nodes; or,
wherein the at least one processor is further configured to:
obtain nodes having common information in the isolated subgraphs, wherein the common information comprises the same identity information.

* * * * *